(12) United States Patent
Spiro

(10) Patent No.: US 11,122,748 B2
(45) Date of Patent: Sep. 21, 2021

(54) AUTOMATED OUTDOOR MODULAR VERTICAL PLANT CULTIVATION SYSTEM

(71) Applicant: Daniel S. Spiro, Scottsdale, AZ (US)

(72) Inventor: Daniel S. Spiro, Scottsdale, AZ (US)

(*) Notice: Subject to any disclaimer, the term of this patent is extended or adjusted under 35 U.S.C. 154(b) by 90 days.

(21) Appl. No.: 16/202,821

(22) Filed: Nov. 28, 2018

(65) Prior Publication Data
US 2019/0166770 A1    Jun. 6, 2019

Related U.S. Application Data

(60) Provisional application No. 62/592,246, filed on Nov. 29, 2017.

(51) Int. Cl.
| | | |
|---|---|---|
| *A01G 9/02* | (2018.01) | |
| *A01G 13/02* | (2006.01) | |
| *A01G 7/04* | (2006.01) | |
| *A01G 27/00* | (2006.01) | |
| *A01G 9/26* | (2006.01) | |

(52) U.S. Cl.
CPC ............ *A01G 9/023* (2013.01); *A01G 7/045* (2013.01); *A01G 9/26* (2013.01); *A01G 13/0206* (2013.01); *A01G 27/005* (2013.01)

(58) Field of Classification Search
CPC ... A01G 9/14; A01G 9/02; A01G 9/16; A01G 9/20; A01G 9/24
See application file for complete search history.

(56) References Cited

U.S. PATENT DOCUMENTS

| 1,560,436 A | 11/1925 | Staples |
|---|---|---|
| 2,723,341 A | 11/1955 | Greenspan |
| (Continued) | | |

FOREIGN PATENT DOCUMENTS

| CA | 2859165 | 6/2013 |
|---|---|---|
| CN | 103416292 | 12/2013 |
| (Continued) | | |

OTHER PUBLICATIONS

Spiro, Daniel S., Automated Vertical Plant Cultivation System, Patent Cooperation Treaty Application Serial No. PCT/US18/31429, filed May 7, 2018, International Search Report and Written Opinion dated Sep. 24, 2018.

*Primary Examiner* — Timothy D Collins
*Assistant Examiner* — Brittany A Lowery
(74) *Attorney, Agent, or Firm* — Barnes & Thornburg LLP; Irina N. Sullivan; Michael Carrillo

(57) ABSTRACT

An automated outdoor modular vertical plant cultivation system forming a vertical structure is provided. The system includes a plurality of shelves, each shelf having a web and flanges; two posts, each post having a web and flanges. Each shelf of the plurality of shelves is mounted between the two posts with incremental spacing between each adjacent shelf along a vertical length of the two posts. The web of each shelf includes a plurality of openings for retaining planter vessels. The flanges of each shelf retain an embedded structural member. The system includes a fluid circulatory system including shelf irrigation piping extending longitudinally above the web of each shelf; and power or power and data and fluid members for the system distributed from vertical risers located in proximity to the web of the posts, wherein the flanges of the shelves have provisions to retain the fluid circulatory system.

9 Claims, 14 Drawing Sheets

(56) References Cited

U.S. PATENT DOCUMENTS

| | | | |
|---|---|---|---|
| 3,030,735 A | 4/1962 | Bodkins | |
| 4,295,296 A | 10/1981 | Kinghorn | |
| 4,845,602 A | 7/1989 | Lehocki | |
| 5,454,187 A | 10/1995 | Wasserman | |
| 5,524,387 A | 6/1996 | Whisenant | |
| 6,061,957 A | 5/2000 | Takashima | |
| 6,105,309 A * | 8/2000 | Takayanagi | A01G 31/02 47/62 R |
| 6,134,832 A | 10/2000 | Bokmiller et al. | |
| 6,536,159 B1 | 3/2003 | Van Den Ende | |
| 8,549,788 B2 | 10/2013 | Bryan, III | |
| 8,864,331 B2 | 10/2014 | Kalb | |
| 9,775,330 B1 | 10/2017 | Chen | |
| 9,974,252 B2 | 5/2018 | Aykroyd et al. | |
| 2003/0145519 A1 | 8/2003 | Winsbury | |
| 2004/0110279 A1 | 6/2004 | Everett | |
| 2007/0104841 A1 | 5/2007 | Min | |
| 2007/0199241 A1 | 8/2007 | Peleszezak | |
| 2008/0092442 A1 | 4/2008 | Singer | |
| 2008/0222949 A1 | 9/2008 | Bissonnette | |
| 2008/0251483 A1 * | 10/2008 | Davis | A47F 5/0018 211/187 |
| 2010/0146854 A1 | 6/2010 | Cannon | |
| 2011/0000807 A1 | 1/2011 | Snelten | |
| 2011/0219689 A1 | 9/2011 | Hodson-Walker | |
| 2011/0258927 A1 | 10/2011 | Carter | |
| 2012/0019382 A1 | 1/2012 | Kohler et al. | |
| 2012/0054061 A1 | 3/2012 | Fok | |
| 2012/0144740 A1 | 6/2012 | Igarashi | |
| 2012/0260569 A1 | 10/2012 | Golgotiu | |
| 2013/0074408 A1 | 3/2013 | Singh | |
| 2013/0255146 A1 | 10/2013 | Lehman | |
| 2013/0294065 A1 | 11/2013 | Wells | |
| 2014/0000162 A1 | 1/2014 | Blank | |
| 2014/0115958 A1 | 5/2014 | Helene | |
| 2014/0208642 A1 | 7/2014 | Henman et al. | |
| 2014/0230326 A1 | 8/2014 | Wilson et al. | |
| 2014/0318012 A1 | 10/2014 | Fujiyama | |
| 2015/0000191 A1 | 1/2015 | Nagadome | |
| 2015/0223402 A1 | 8/2015 | Krijn | |
| 2015/0223418 A1 | 8/2015 | Collins et al. | |
| 2016/0037737 A1 | 2/2016 | Fingerle | |
| 2016/0128288 A1 | 2/2016 | Pettinelli | |
| 2016/0135395 A1 | 5/2016 | Umpstead | |
| 2016/0192606 A1 | 7/2016 | Karbowski | |
| 2016/0205739 A1 | 7/2016 | Grajcar | |
| 2016/0316645 A1 | 11/2016 | Neufeld | |
| 2016/0316646 A1 | 11/2016 | Lepp | |
| 2016/0345518 A1 | 12/2016 | Collier | |
| 2016/0360712 A1 | 12/2016 | Yorio | |
| 2017/0071143 A1 | 3/2017 | Newsam | |
| 2017/0079223 A1 | 3/2017 | Cheng | |
| 2017/0105372 A1 | 4/2017 | Bryan, III | |
| 2017/0202156 A1 | 7/2017 | Harms | |
| 2017/0202164 A1 | 7/2017 | Dufresne | |
| 2018/0042191 A1 | 2/2018 | Blackburn | |
| 2018/0042192 A1 | 2/2018 | Volpe | |
| 2018/0103599 A1 | 4/2018 | Zhan | |
| 2018/0168108 A1 | 6/2018 | Foreman | |
| 2019/0246584 A1 | 8/2019 | Hsueh | |

FOREIGN PATENT DOCUMENTS

| | | | |
|---|---|---|---|
| CN | 104584924 | 5/2015 | |
| FR | 2322573 | 1/1977 | |
| FR | 2322573 | 4/1977 | |
| GB | 201715204 | * 11/2017 | A01G 9/023 |
| JP | 2016539662 | 12/2016 | |
| KR | 20120015684 | 2/2012 | |
| KR | 20120042304 | 5/2012 | |
| WO | WO 2015/072076 | 5/2015 | |
| WO | 2015140493 | 9/2015 | |
| WO | 2016027409 | 2/2016 | |
| WO | WO 2016/027409 | 2/2016 | |
| WO | 2017024353 | 2/2017 | |
| WO | WO 2017/024353 | 2/2017 | |

* cited by examiner

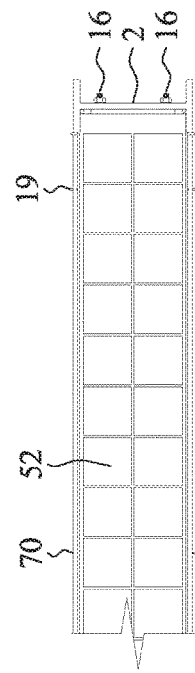
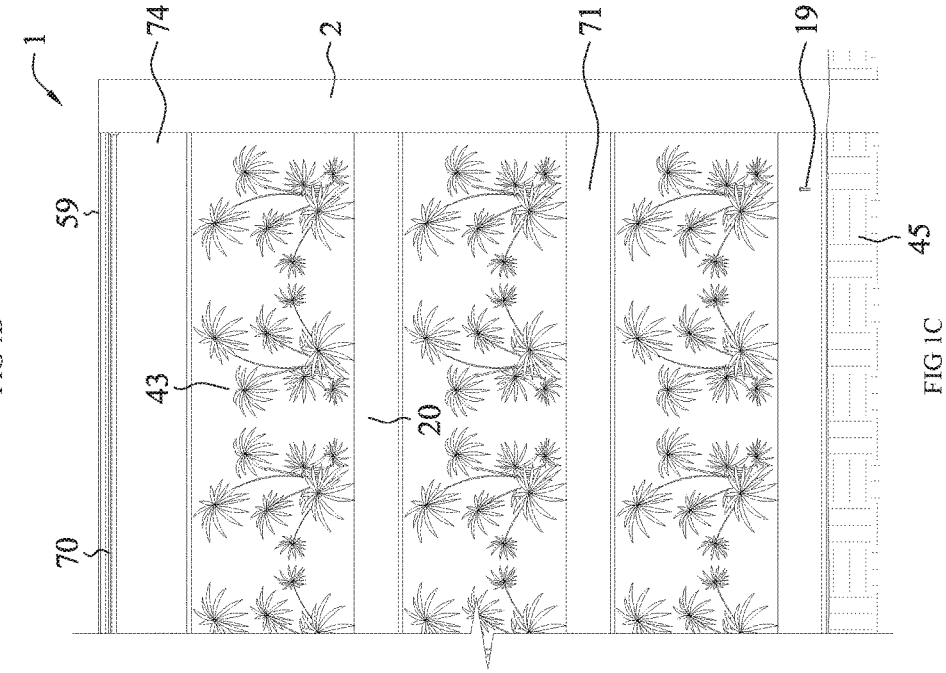
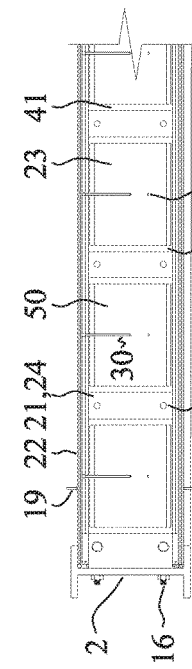
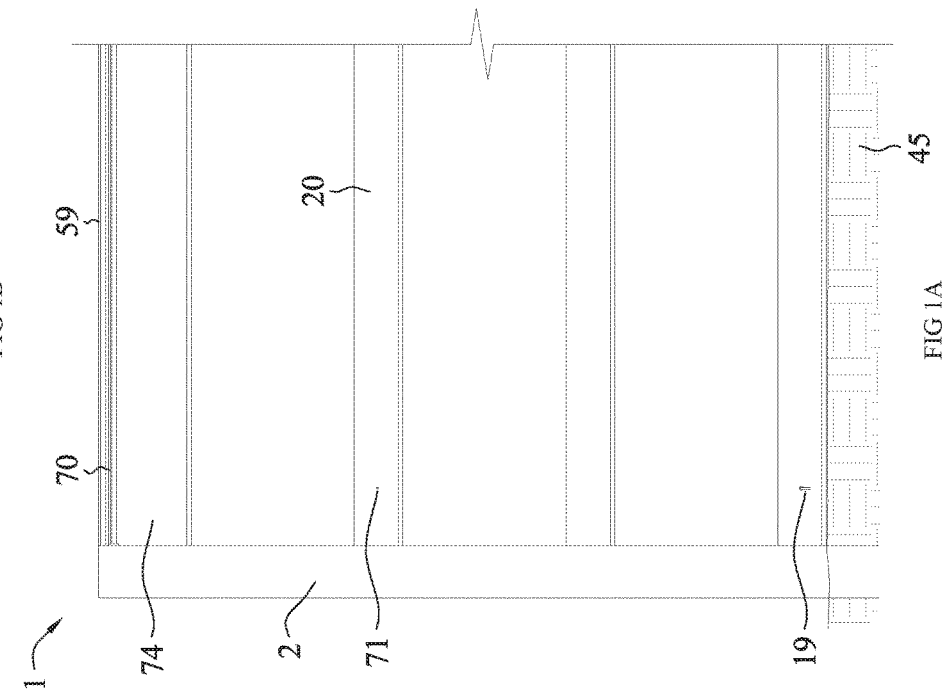

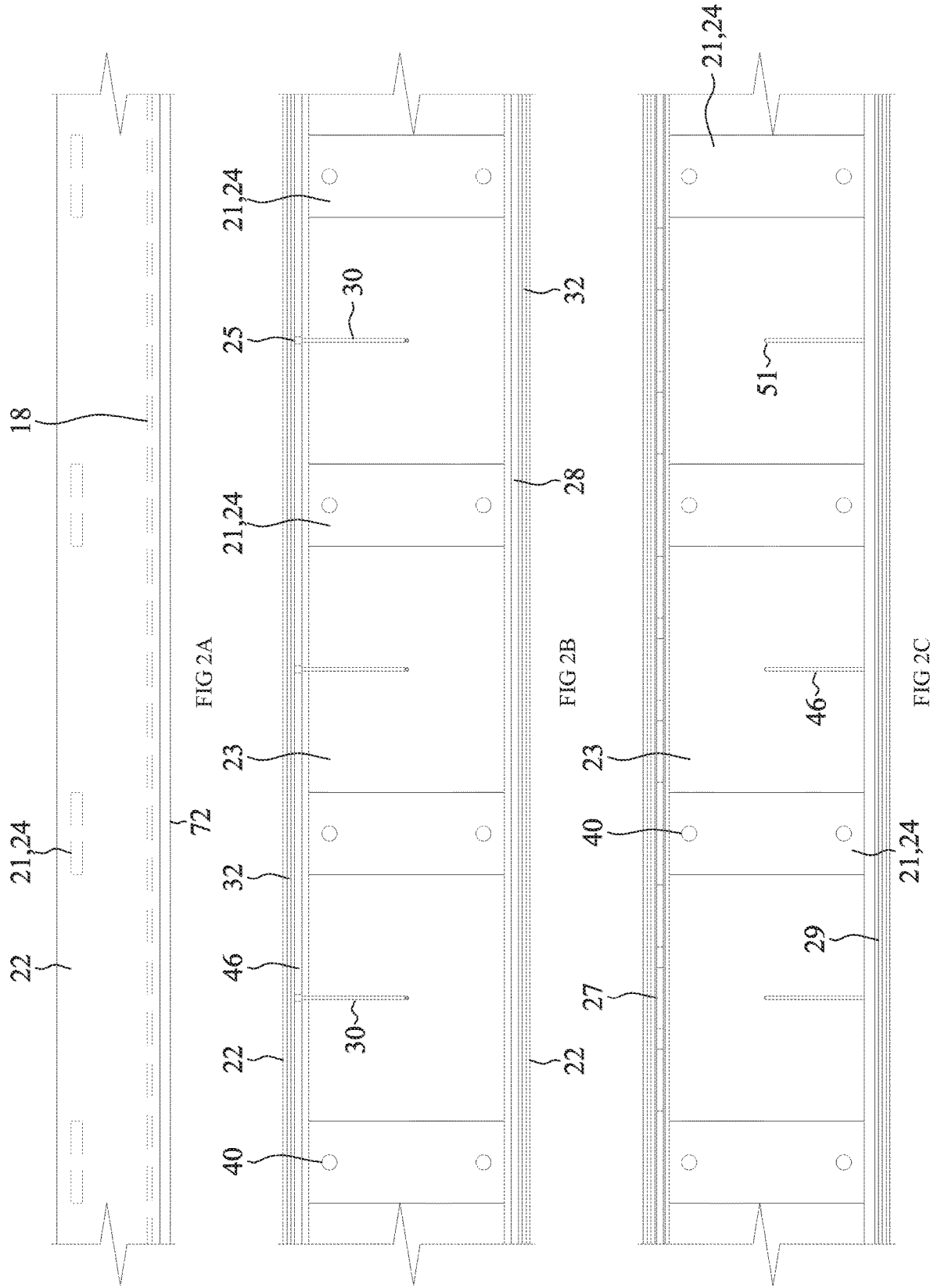

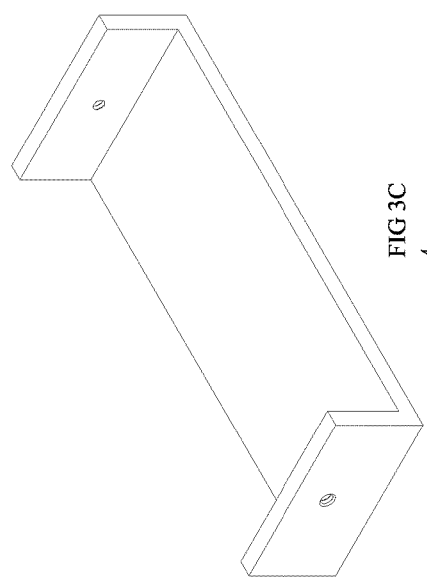
FIG 3A
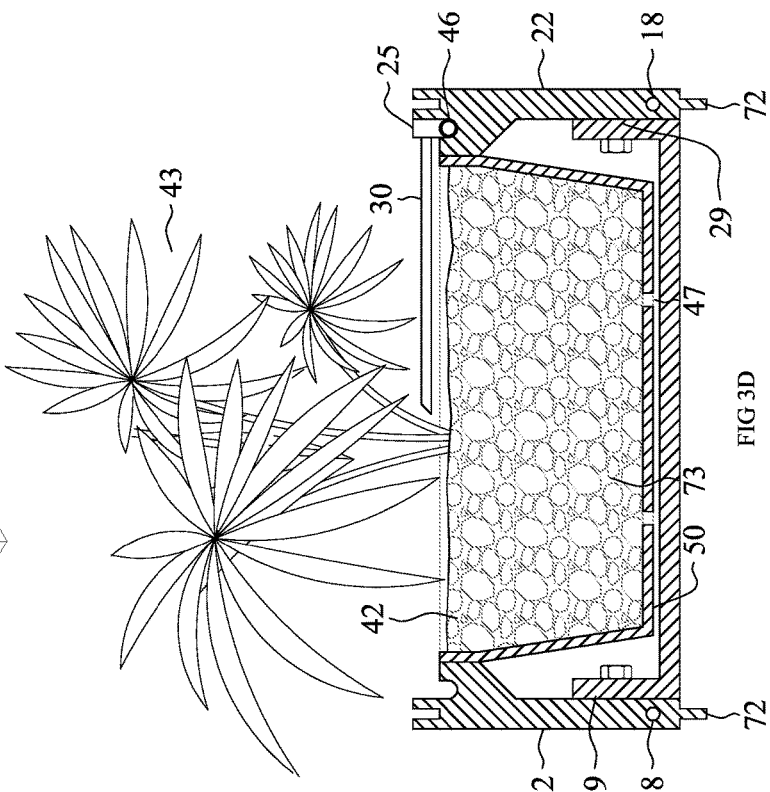
FIG 3C
FIG 3D
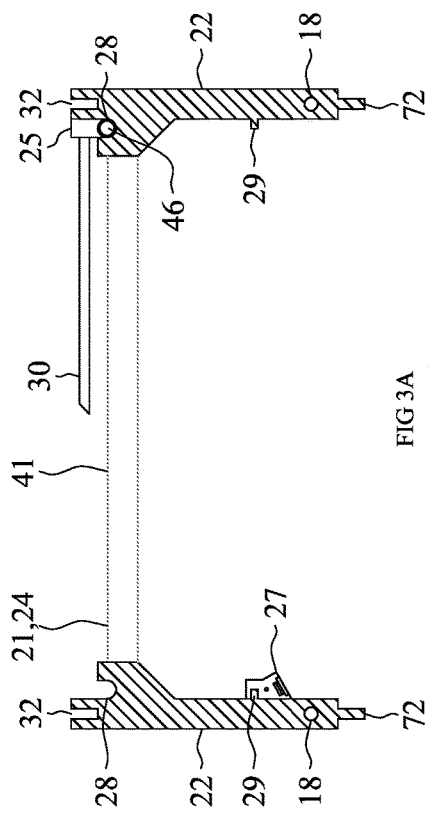
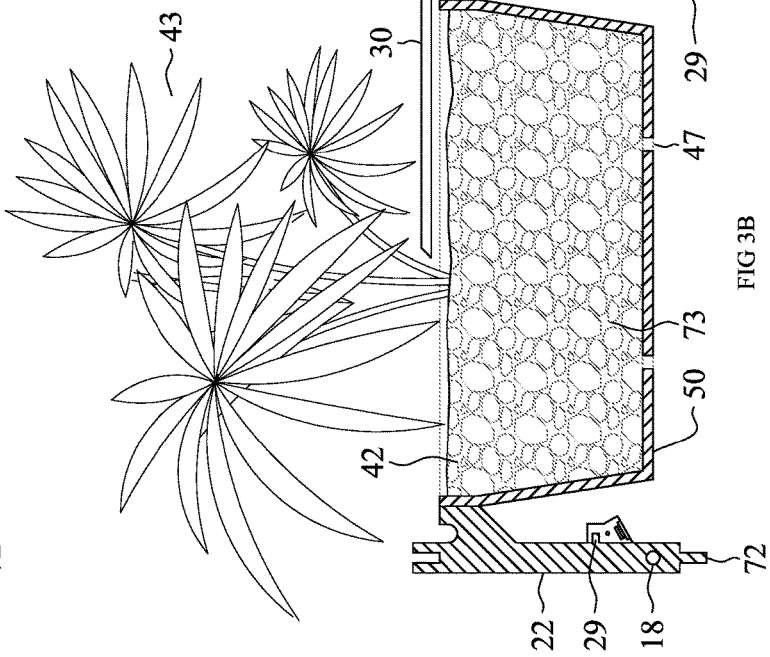
FIG 3B

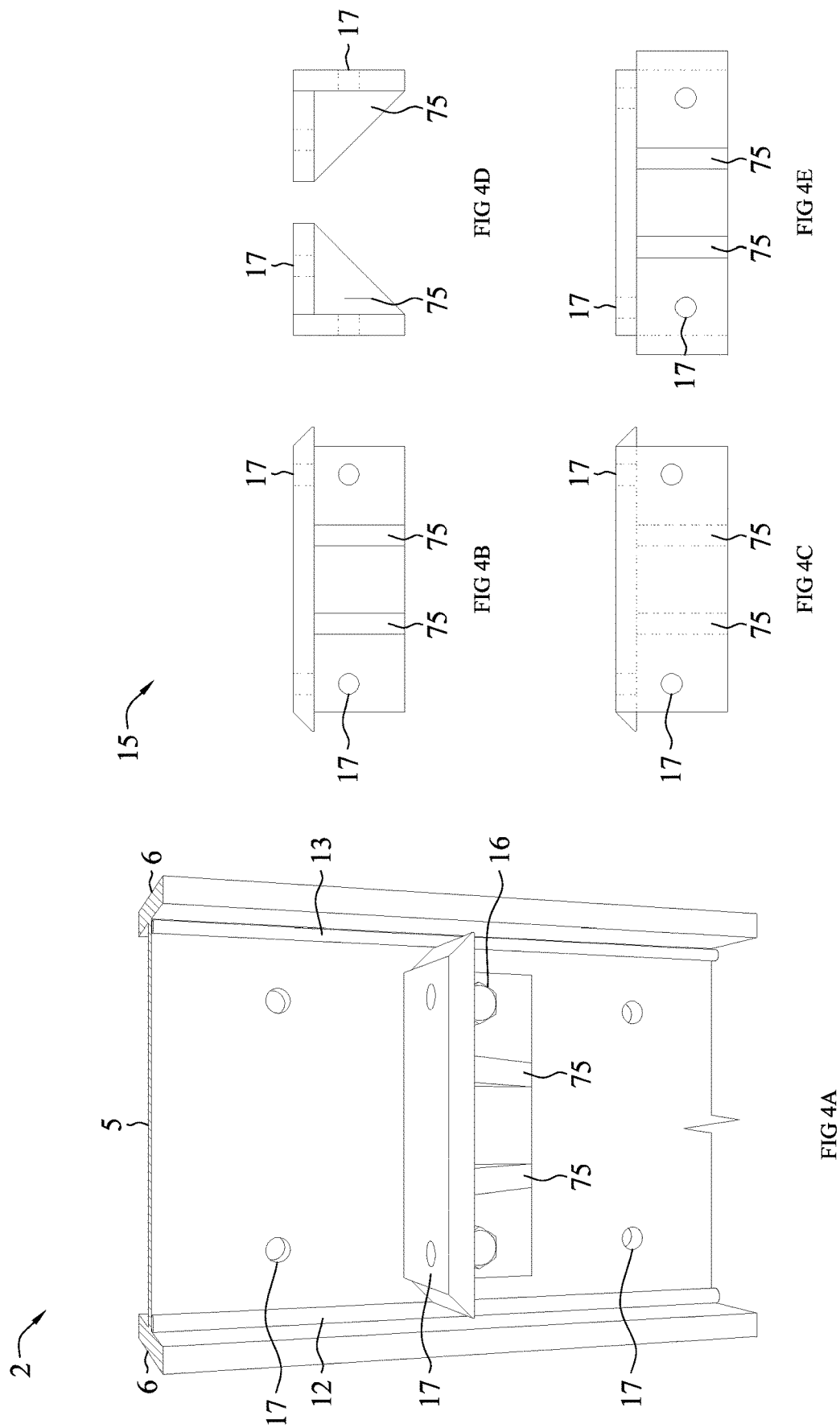

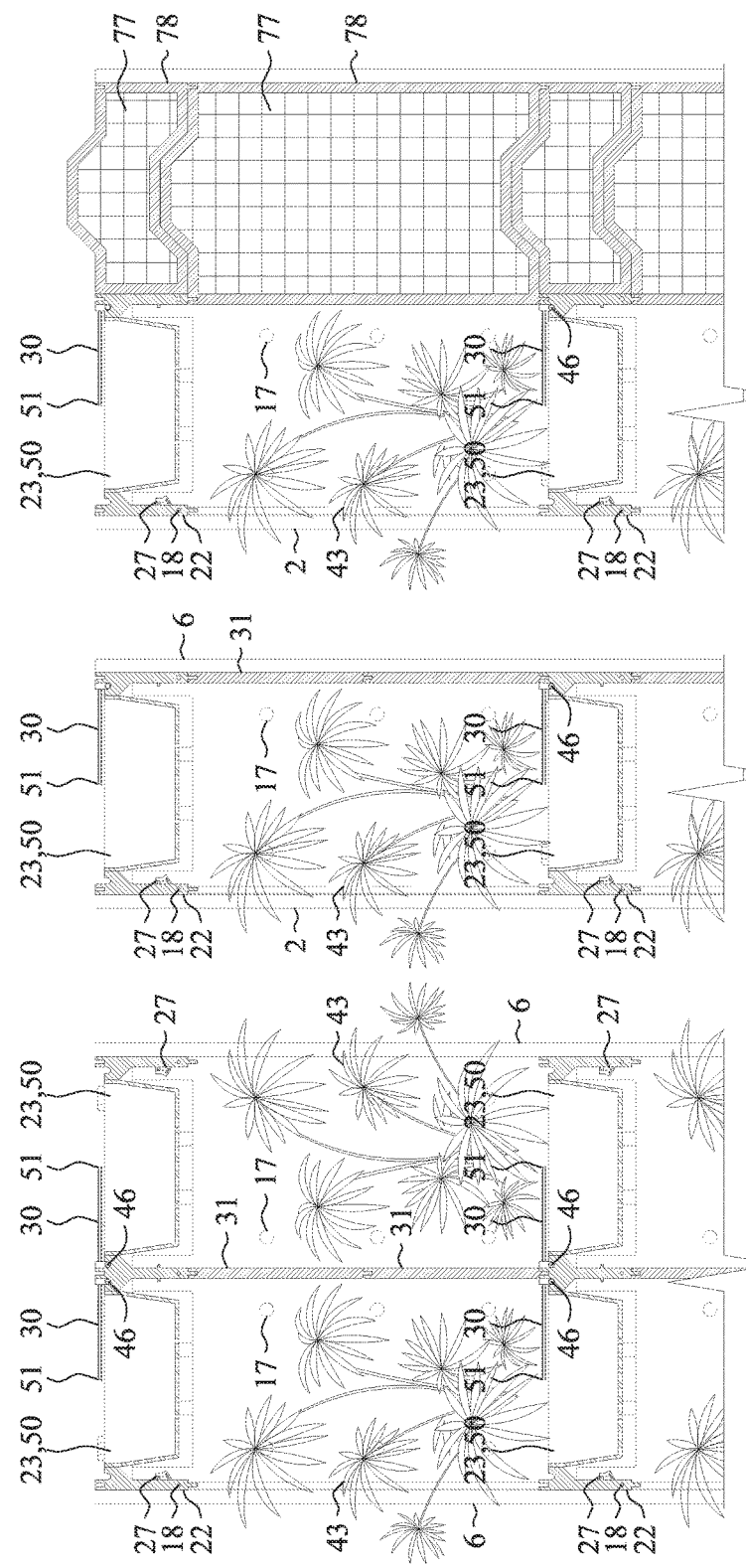

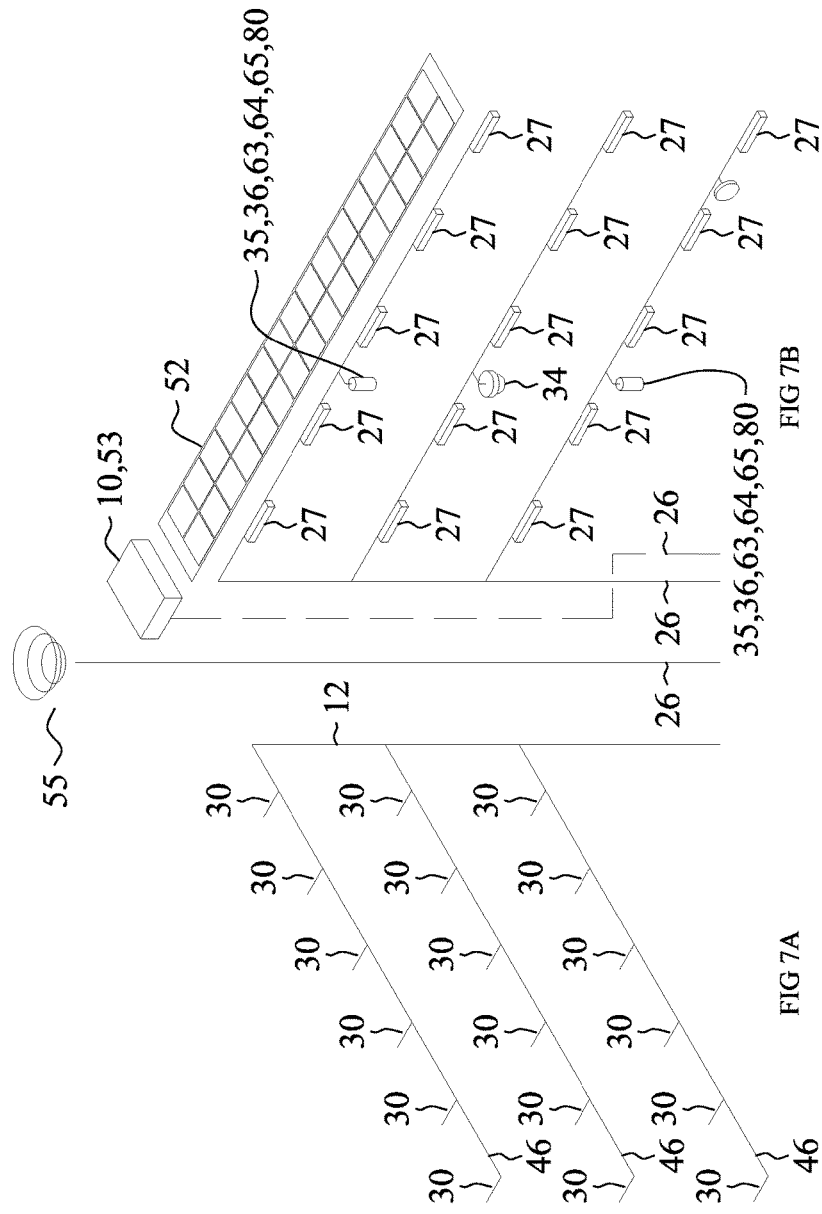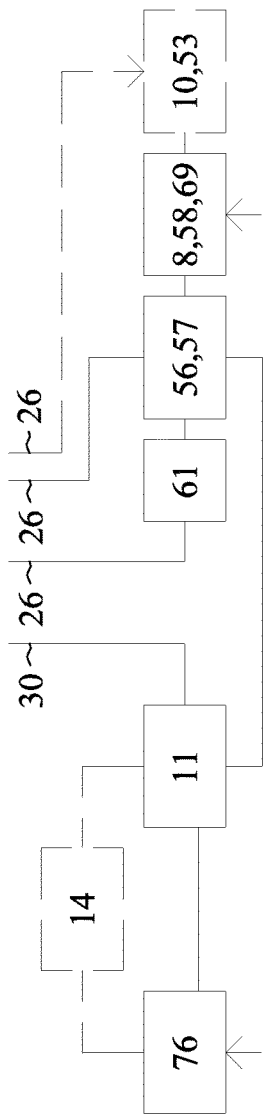

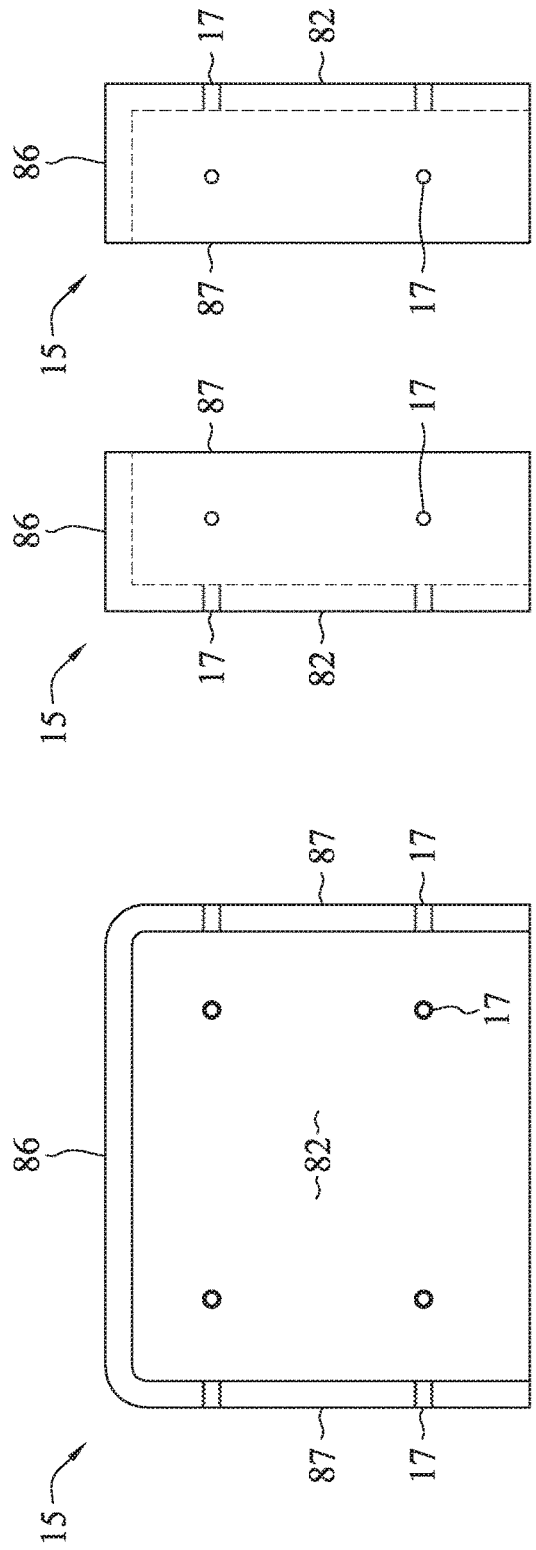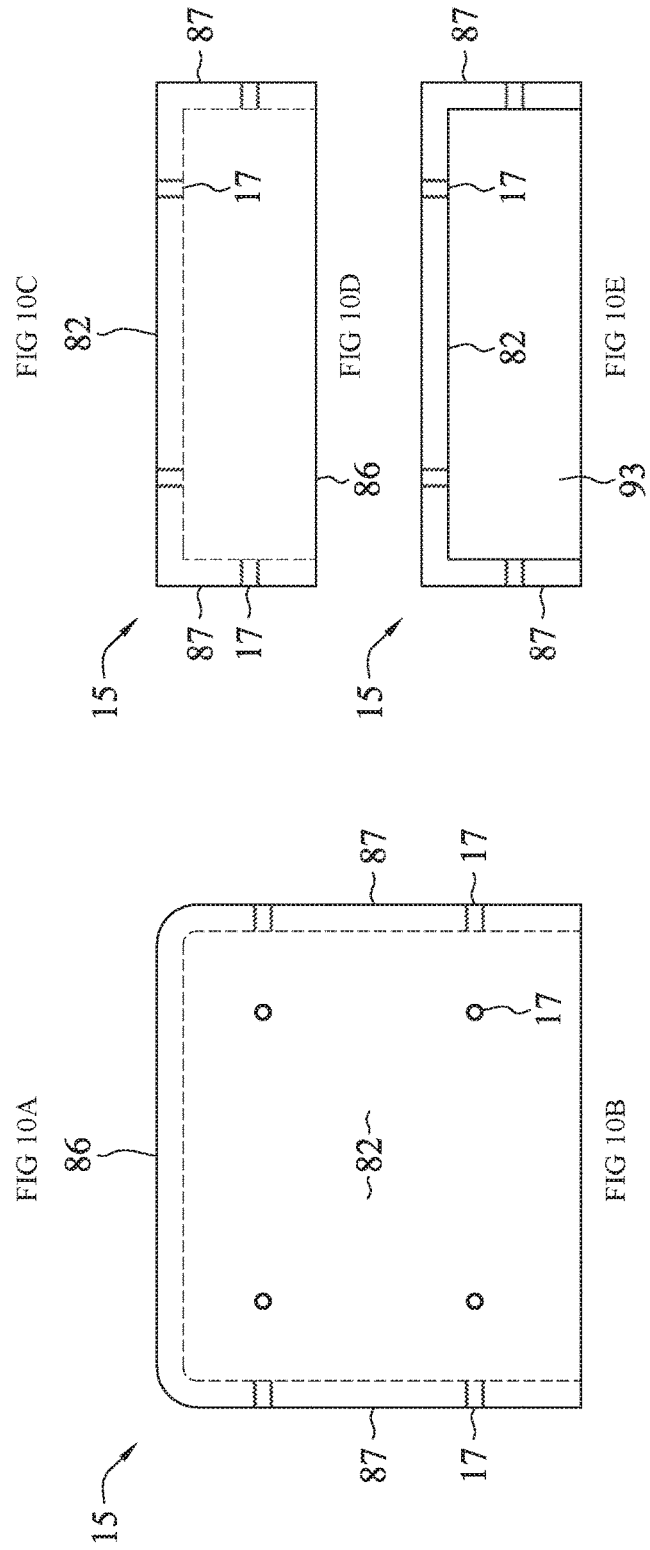

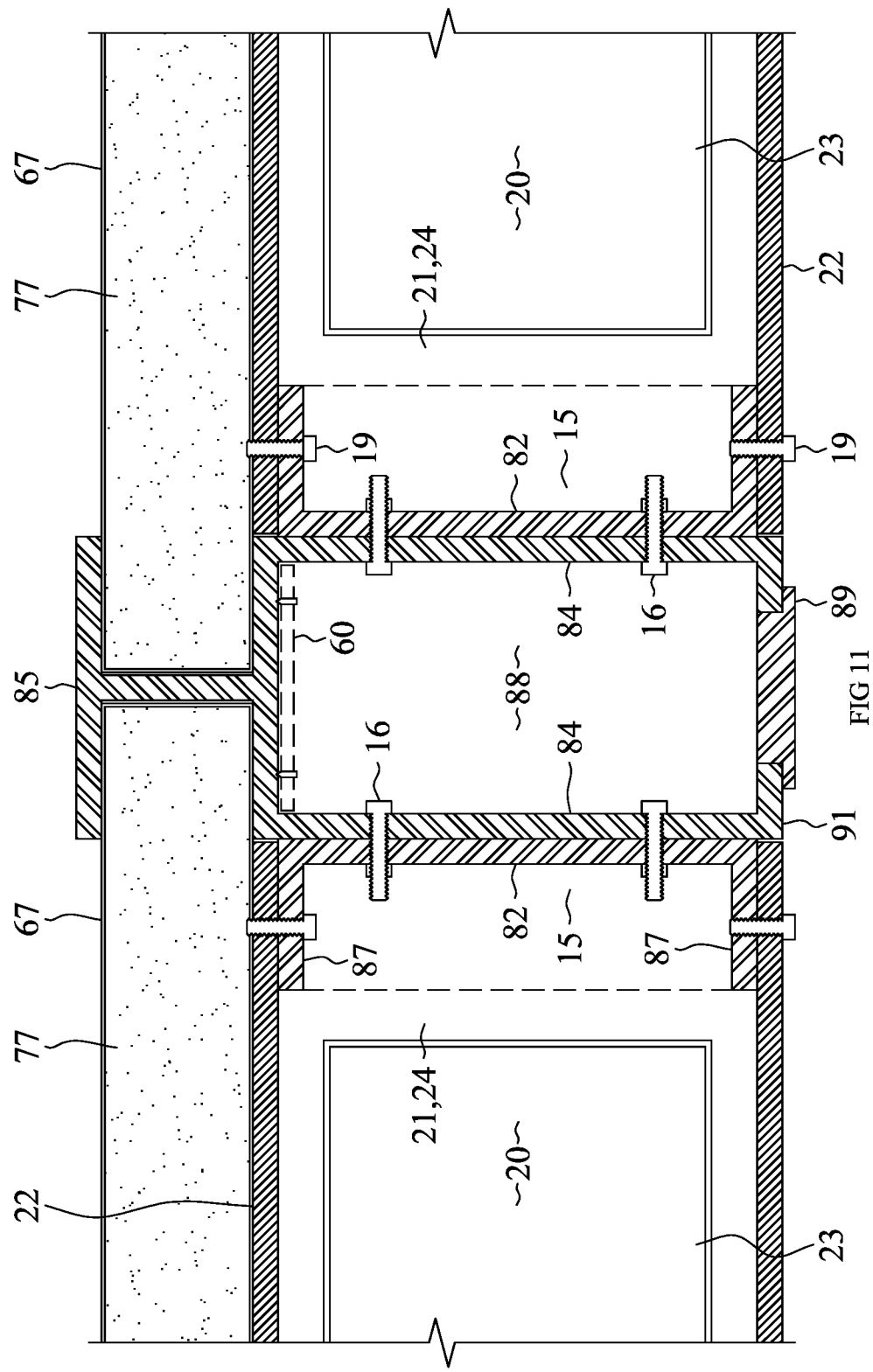

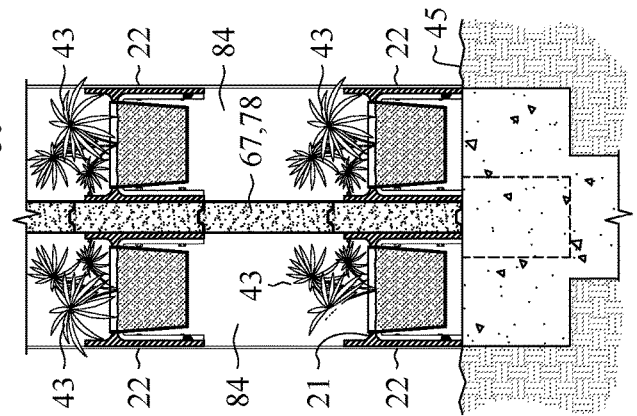
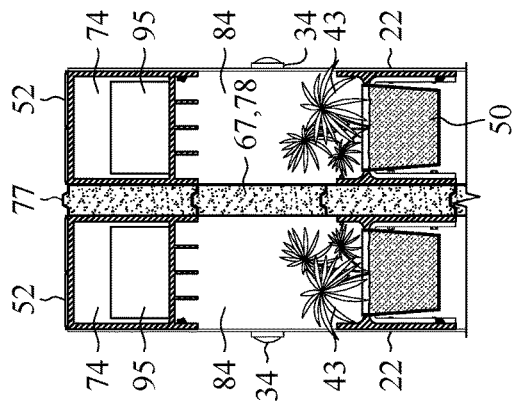
FIG 13C
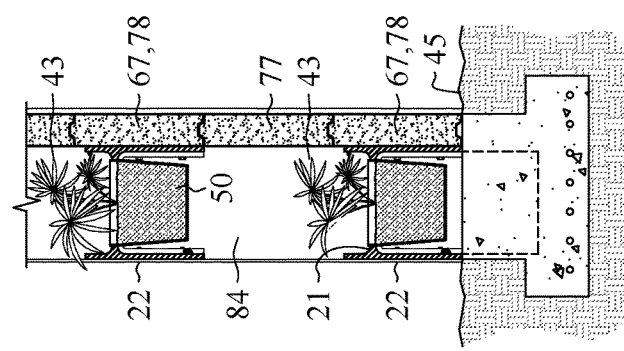
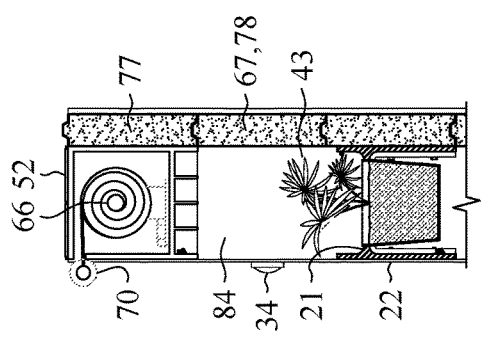
FIG 13B
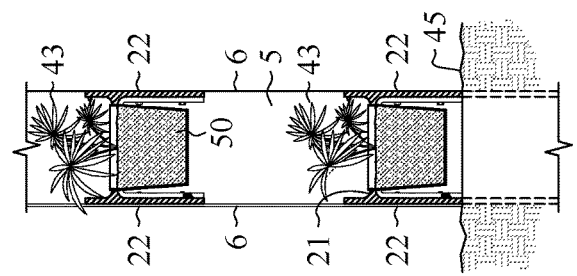
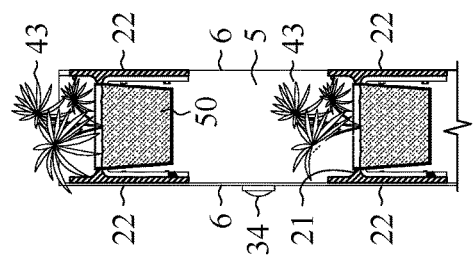
FIG 13A

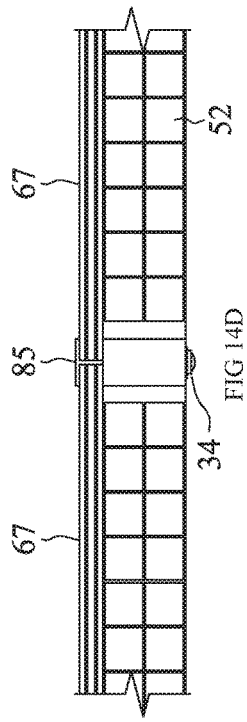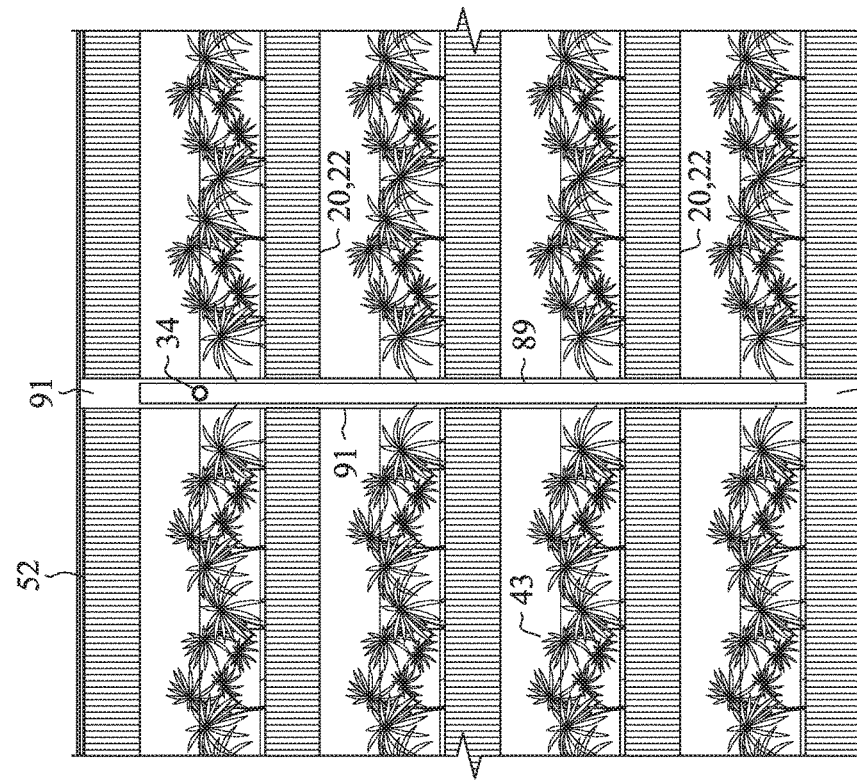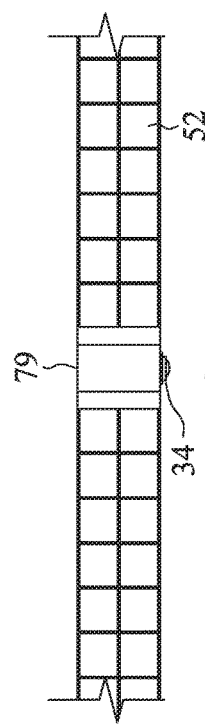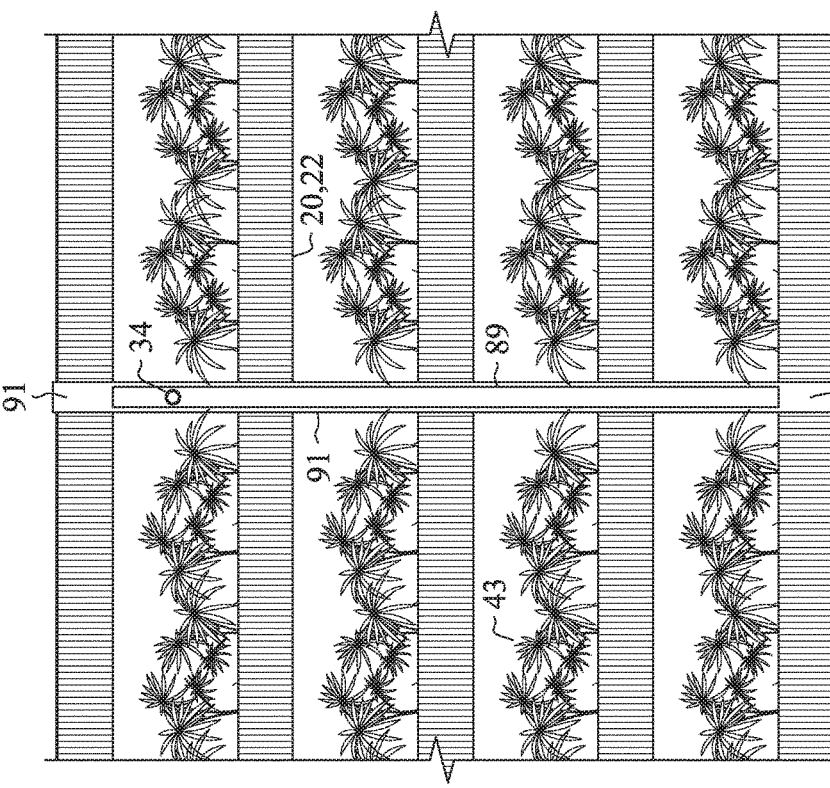

US 11,122,748 B2

AUTOMATED OUTDOOR MODULAR VERTICAL PLANT CULTIVATION SYSTEM

CROSS REFERENCE TO RELATED APPLICATION[S]

This application is a continuation-in-part of the earlier U.S. Utility patent entitled "ATUOMATED VERTICAL PLANT CULTIVATION SYSTEM," Ser. No. 15/589,845, filed May 8, 2017, now pending, and claims priority to U.S. Provisional Patent Application Ser. No. 62/592,246, filed Nov. 29, 2017, the disclosures of which are hereby incorporated entirely herein by reference.

BACKGROUND OF THE INVENTION

Technical Field

This invention relates generally to a plant cultivation system, and more particularly to an automated outdoor modular vertical plant cultivation system suited to urban and suburban environments, employing seeded and planted plant vessels.

State of the Art

More than fifty percent of the world's population lives in urban environments, and this percentage continues to grow. This growth drives real estate prices higher, which in turn, reduces lot size affordability for the average income earner.

Urban and suburban single-family homes usually have front, back and side yards. Typically, the back-yard activities are more private and are associated with social, recreational and gardening activities. As real estate lot sizes diminish due to increasing cost, owners must decide which activities should have priority. In so doing, they often compromise on other activities. Furthermore, masonry CMU fence walls are commonly built in subdivision. These walls are architecturally unappealing and generate from manufactured through installation a significant carbon emission footprint. The CMU walls, concrete walls or combination of both are often used for commercial, and institution building. These walls share the same detriments as is in residential application often exacerbating the issues by the sheer size. In some applications, there is a need for sound attenuation reducing or eliminating noise travel from one side of the wall to the other. A common application for such a need is when a freeway or a noisy commercial facility is near residential neighborhoods. In such circumstances the residents typically face a tall and un-attractive wall creating a sense of imprisonment. To overcome the detriments of the conventional masonry or concrete wall, the present innovation grows on a vertical structure plant material while solving all privacy, security and sound transmittance issues.

SUMMARY OF THE INVENTION

An embodiment includes an automated outdoor modular vertical plant cultivation system forming a vertical structure, the system comprising: a plurality of shelves, each shelf having a web and flanges; two posts, each post having a web and flanges, wherein: each shelf of the plurality of shelves are mounted between the two posts with incremental spacing between each adjacent shelf along a vertical length of the two posts; the web of each shelf includes a plurality of openings for retaining planter vessels; and the flanges of each shelf retains an embedded structural member that extends the span of the shelf and reduces the shelf height; and a fluid circulatory system including shelf irrigation piping extending longitudinally above the web of each shelf; and power or power and data and fluid members for the system distributed from vertical risers located in proximity to the web of the posts, wherein the flanges of the shelves have provisions to retain the fluid circulatory system. The system may further comprise illumination devices extending longitudinally below the web, wherein the flanges of the shelves have provision to retain a planter vessel illumination system.

Another embodiment includes a linear non-corrosive structure retaining planter vessels comprising: a) an integral depression on at least one face of it profile extending the length of the structure to retain a fluid pipe; b) an integral depression on at least one face of it profile extending the length of the structure to retain power or power and data conductors; and c) an integral depression on at least one face extending the length of the structure to retain linear partition panels.

Yet another embodiment includes a method of forming a vertical barrier employing modular structural members retaining a plurality of planter vessels supported by load bearing posts whereas the structural members can be placed at pre-set incremental distances along the vertical surface of the load bearing posts, and modular panels extending the length of the structure can provide semi-transparent or blocked views.

Yet another embodiment employs a post retaining both the planter shelves and a demising wall/s whereas the post interior becomes a chase that retains fluid and power equipment for the shelf and wall populated devices.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1A shows a partial front view of an automated outdoor modular vertical plant cultivation system, according to an embodiment;

FIG. 1B shows a partial top view of an automated outdoor modular vertical plant cultivation system, according to an embodiment;

FIG. 1C shows a partial front view of an automated outdoor modular vertical plant cultivation system with plant material, according to an embodiment;

FIG. 1D shows a partial top view of an automated outdoor modular vertical plant cultivation system with photovoltaic panels, according to an embodiment;

FIG. 2A shows a partial side view of a shelf an automated outdoor modular vertical plant cultivation system, according to an embodiment;

FIG. 2B shows a partial top view of a shelf an automated outdoor modular vertical plant cultivation system, according to an embodiment;

FIG. 2C shows a partial bottom view of a shelf an automated outdoor modular vertical plant cultivation system, according to an embodiment;

FIG. 3A shows a transverse section view of an automated outdoor modular vertical plant cultivation system, according to an embodiment;

FIG. 3B shows a transverse section view of an automated outdoor modular vertical plant cultivation system with a planter vessel, according to an embodiment;

FIG. 3C shows the planter shelf's flange bracket in perspective view, according to an embodiment;

FIG. 3D shows a transverse section view of the planter shelf with the flange bracket, according to an embodiment;

FIG. 4A shows a partial perspective view of a post with the shelf bracket bolted onto the post web of an automated outdoor modular vertical plant cultivation system, according to an embodiment;

FIG. 4B shows a front elevation of a shelf bracket of an automated outdoor modular vertical plant cultivation system, according to an embodiment;

FIG. 4C shows a back elevation of a shelf bracket of an automated outdoor modular vertical plant cultivation system, according to an embodiment;

FIG. 4D show side elevations of a shelf bracket of an automated outdoor modular vertical plant cultivation system, according to an embodiment;

FIG. 4E shows a bottom elevation of a shelf bracket of an automated outdoor modular vertical plant cultivation system, according to an embodiment;

FIG. 6A shows a partial vertical section of a double back-to-back automated outdoor modular vertical plant cultivation system showing the planter shelf's partition and acoustical wall panels, according to an embodiment;

FIG. 6B shows a partial vertical section of an automated outdoor modular vertical plant cultivation system showing the planter shelf's partition and acoustical wall panels, according to an embodiment;

FIG. 6C shows a partial vertical section of an automated outdoor modular vertical plant cultivation system backed against a sound attenuation panel, according to an embodiment;

FIG. 6D shows side elevation of a partition panel of an automated outdoor modular vertical plant cultivation system, according to an embodiment;

FIG. 6E shows front elevation of a partition panel of an automated outdoor modular vertical plant cultivation system, according to an embodiment;

FIG. 6F shows a perspective of a partition panel of an automated outdoor modular vertical plant cultivation system, according to an embodiment;

FIG. 7A shows a diagram of fluid circulation network, according to an embodiment;

FIG. 7B shows a diagram of data, power and power-consuming devices housed or attached to the vertical planter assembly, according to an embodiment;

FIG. 7C shows a consolidated diagram of a power inlet and fluid inlet, according to an embodiment;

FIG. 10A shows a front elevation of the shelf bracket with side flanges according to an embodiment;

FIG. 10B shows a back elevation of the shelf bracket with side flanges according to an embodiment;

FIG. 10C shows a side elevation of the shelf bracket with side flanges according to an embodiment;

FIG. 10D shows a top elevation of the shelf bracket with side flanges according to an embodiment;

FIG. 10E shows a bottom elevation of the shelf bracket with side flanges according to an embodiment;

FIG. 11 shows an enlarged horizontal section of the chase post just below the planter shelf cross bridge, according to an embodiment;

FIG. 13A shows a transverse section of the plant cultivation system employing a post, according to an embodiment;

FIG. 13B shows a transverse section of the plant cultivation system employing a chase post, according to an embodiment;

FIG. 13C shows a transverse section of the plant cultivation system employing a chase post and wall retaining flanges, according to an embodiment;

FIG. 14A shows a partial front view of an automated outdoor modular vertical plant cultivation system with a demising wall according to an embodiment;

FIG. 14B shows a partial top view of an automated outdoor modular vertical plant cultivation system plant shelf with a demising wall, according to an embodiment;

FIG. 14C shows a partial view of an automated outdoor modular vertical plant cultivation system, with plants and a demising wall, according to an embodiment;

FIG. 14D shows a partial top view of an automated outdoor modular vertical plant cultivation system top mounted photovoltaic panels and a demising wall, according to an embodiment;

DETAILED DESCRIPTION OF EMBODIMENTS OF THE INVENTION

Figure 5B:
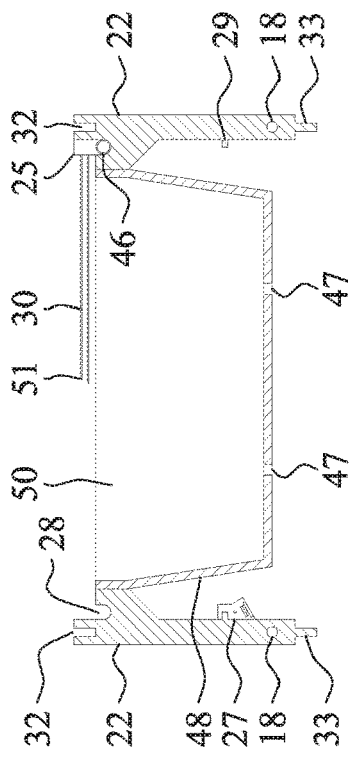
FIG. 5B shows a transverse section taken along line 5B-5B of FIG. 5a of a planter vessel opening of a shelf of an automated outdoor modular vertical plant cultivation system, according to an embodiment.

An automated outdoor modular vertical plant cultivation system solves the yard space problem by transforming the property fence into a vertical garden, thus freeing both the back and side yards for other activities.

The System is a structural post and beam frame load bearing wall. Its horizontal beams retain plant material 43. The beams described herein as the planter shelves 20 are shaped like the letter "I" and are rotated horizontally with their top end flanges shorter than their bottom end flanges. The planter shelves' web 21 is perforated with modularly spaced plant vessel openings 23 into which planter vessels 50 are placed. The planter shelf 20 can be placed anywhere along the vertical face of the post 2, mounted to the shelf bracket 15.

At least one inner side of the post flanges 6 above the planter shelf web 21 contains an irrigation pipe 30 extending the length of the shelf with a "T" junction 25 spaced at the same spacing as the planter vessel openings 23. The planter vessel irrigation pipe 30 connects to the "T" junction with a pipe that extends over the planter vessel's irrigation aperture 42. In a different embodiment employing drip irrigation, the planter irrigation pipe may be embedded inside the planter vessel 50 or connected to a port in the planter vessel. The irrigation circulatory system may contain nutrients and/or pesticide solution/s. These additives can be poured into the fluid container/mixing tank 14 mounted to the post 2 and/or placed inside the tarp housing 74 section.

At least one inner side of the planter shelf flanges 22 below the web 21 has power or power and data conductor/s 26 extending the length of the shelf with connectivity to a plurality of concealed light devices 27. The light devices 27 are aimed at plant material 43 below. The light devices' 27 placement is associated with the placement of the planter vessels 50 of the shelf. In addition, power consuming devices can be attached to the planter shelves 20, posts 2, planter vessels 50, and the surrounding area. These devices may include a pump 11, a processor 56 with resident memory and program, communication module for both wired and wireless devices 61, controller 57, camera 34, speaker 35, microphone 62, occupancy sensor 63, humidity sensor 36, temperature sensor 64, perimeter security sensor 65, backup storage device 10, inverter 53, driver 54, power supply 69, and power generating device 52. In some embodiments a plurality of devices can be mounted on a tray (not shown) and the tray can be mounted to the post's wall 84. Such tray can be assembled and secured to the post's wall 84 or other enclosure/s 74 away from the installation location, reducing assembly time and opportunity for installation error/s.

Non-powered devices may include protective tarp 37 to provide protective covering to plant material 43 against frost, partition panels 31 and crossbars 39 to turn the System into an impenetrable fence.

The planter shelves' 20 assembly may permit viewing beyond the planter, or not. Grooves 32 extending the length of the planter shelf top flanges 22 and protrusions at the bottom flanges provide mounting contact surfaces for tongue and groove modular partition panels 31. The panels may vary in width, length and height, based on application needs. In a different embodiment, the System provides a vertical garden for two adjoining properties. In this scenario, the vertical planter assembly 1 partition panels 31 are located at the longitudinal center of the planter shelf 20 with planter vessel openings 23 on both sides.

The planter shelves 20 are bolted onto "L-shaped" shelf brackets 15 which are also bolted into the "I-beam" shaped post 2. The brackets 15 are mounted along the post web 5, having bores 17 pre-drilled at repeated spacing. The post 2 and planter shelves 20 assembly height is constrained only by its ability to support its own weight and to resist wind load forces. When the planter shelves 20 are fabricated of a none-metallic, the shelves' span can be extended by embedding tensile reinforcement 18 at the bottom end of the flanges 22. That reinforcement can take the entire cross-sectional interior area of both the shelf 20 and/or the post 2.

The post may support additional elements aside from the planter shelf. In one embodiment, the post's horizontal cross-section shows three flanges on each side of its web (not shown). One of the exteriors facing flanges and the center flange support the axial load of the planter shelf/s. The other exterior facing flange and the center flange support the lateral loads of the panelized wall.

In applications where a sound attenuation wall 77 and/or thicker wall is required, the shelf retaining post 2 can be configured to retain such walls without inducing vertical loads on the post 2. The post then can be fabricated monolithically having flanges 6 to retain the wall panels 67 and chase walls 84 to mount the planter shelves 20 employing the planter shelf brackets 15. Referred herein as the chase post 83, the chase post 83 reduces the load of the planter shelves 20 by dividing the loads of the shelves between two walls each carrying the load of its corresponding side shelves. The space between the two walls can then become a chase that can retain the cultivation system power 99, processing 96, communication 98 and fluid 100 electromechanical key elements secured and protected from the elements. The chase post 83 with wall can retain planter shelves 20 on one or both sides. The width of the wall can be variable. The post 2 and the chase post 83 can be directly embedded in the ground 45 or resting on a foundation. Directly embedded posts 2, whether supporting planter shelves 20 only or supporting planter shelves 20 and wall panels 67, can also be driven into the ground 45. In such application the bottom of the post 2 may have a tip to enable easier soil penetration (not shown).

The System's entire assembly can be fabricated from metallic or non-metallic non-corrosive material resistant to minerals and pollution. Metallic members can be anodized or galvanized. Metallic members may also be coated with non-corrosive material like a polymer with paint bonding surfaces. The assembly's key elements, the post 2 and the planter shelves 20, can be fabricated through the process of extrusion with the ability to control the members' cross-sectional profile. Also, the fabrication of the flange walls can be altered to provide different appearances and support different plant vessels' 50 loads. The assembly surfaces can be painted and coated with UV inhibitors.

The System is also suited to public works environments such as a separation between roadways and residential neighborhoods, institution buildings such as museums and court buildings, commercial buildings such as offices and malls, multi-family apartments/condominiums, and vertical community gardens in cities' vacant lots. When the System is employed between noise generating public ways and residential neighborhoods, the assembly can employ both sound attenuation panels and planter shelves in concert.

FIGS. 1a, 1b, 1c, and 1d show partial views of the planter shelf assembly 1.

FIG. 1a shows the planter shelf assembly 1 key elements. These elements include the shelf support post 2 and the planter shelf 20. Also shown in this embodiment is a tarp housing 74 at the top of the assembly. The tarp housing 74 is used in climactic zones where plant material 43 is exposed to freezing temperatures. When temperatures drop to freezing levels, the tarp pull bar 70 is pulled down to cover the planter assembly 1 and secured to hooks 1a shown at the figure's bottom shelf. Each of the planter shelves has prefabricated hook bores 71 enabling the tarp placement as needed. Also, with extender bars (not shown), the tarp can be pulled horizontally, providing shade in front of the planter shelf assembly 1.

In another embodiment, the top shelf can be an enclosure to electronic and data equipment, and/or plant material 43 fluid storage and/or mixing tanks. A top cover 59 is common to all top shelves retaining a volumetric enclosure(s).

FIG. 1*b* shows a top view of the planter shelf 20 mounted onto a post 2. The planter shelf flanges 22 are integrally connected to the planter shelf web 21. The web is also referred to as the bridge 24. Planter shelf plant vessel openings 23 populate the planter shelf web 21 at a repeating pattern having the web bridge 24 provide a vessel's ledge 41 to support the planter vessel 50. Also shown is the plant irrigation pipe 46 over the center of the plant irrigation aperture 42.

FIG. 1*c* shows the same features as FIG. 1*a*. It also shows plant material 43 spaced apart on three planter shelves 20. The spacing of the planter vessels 50 can be flexible based on plant material 43 needs and architectural preference.

FIG. 1*d* shows the top view of the shelf plan assembly 1 with photovoltaic panels 52 placed on top of the top cover 59. When photovoltaic panels 52 are used, inverter 53, power supply 69 and backup power storage device 10 can be retained inside a top shelf enclosure (not shown).

FIGS. 2*a*, 2*b* and 2*c* show partial enlarged side, top and bottom views of the planter shelf 20.

FIG. 2*a* shows the planter shelf 20 side view. The view shows the planter shelf flange 22 jointed to its web/bridge 21/24 beyond and an optional tensile reinforcement 18 embedded inside the shelf flange 22. Also shown at the bottom of the flange is a continuous shelf flange partition protrusion 72.

FIG. 2*b* shows the planter shelf 20 top view. Elements shown include partition insert groove 32, "T" junction 25, planter vessel irrigation pipe 30, planter irrigation pipe 46, planter shelf flange 22, planter shelf web/bridge 21/24, planter shelf plant vessel opening 23 and cross bar bore 40. The plant vessel 50 (not shown) is inserted into the plant vessel opening 23 supported by ledges at the bridge 24. The bridge may have a means to lock the plant vessel 50 in place to eliminate plant vessel 50 theft risk (not shown).

FIG. 2*c* shows the planter shelf 20 bottom view. Elements shown include the planter shelf web/bridge 21/24, crossbar bore 40, plant vessel 50, lighting device 27, power/data mounting protrusion 29 on the inner face of the opposite flange 22. The planter shelf plant vessel opening, and plant irrigation pipe 46 have fluid nozzle 51 over the plant irrigation aperture 42 (not shown).

FIGS. 3*a* and 3*b* show transverse sections through the planter shelf 20 including its irrigation and power/data conveyance devices.

FIG. 3*a* shows the planter shelf 20 having two flanges 22 and planter shelf web bridge 21/24 joining them in proximity to the shelf's top. Along the top of the flanges 22, partition insertion grooves extend the length of the shelf. Next to the grooves on the inner face of the flanges 22, fluid pipe grooves 28 extend the length of the shelf. The planter irrigation pipe 46 retained inside the pipe groove 28 with a "T" junction 25 diverts fluid to the plant vessel 50 through the vessel's irrigation pipe 30. At the flanges' 22 inner face toward the bottom, power/data protrusion 29 provides mounting surface to power- and data-consuming devices. In this embodiment a continuous lighting device extends the length of the planter shelf 20. Also shown in this embodiment are optional tensile reinforcements 18, and at the bottom of the flanges 22, shelf flange partition protrusions.

FIG. 3*b* shows the same section as FIG. 3*a*, also including a plant vessel. Additional elements shown are plant material 43, plant vessel 50, moisture evacuation outlet 47, root retaining medium 73, and plant irrigation aperture 42.

FIG. 3C shows a perspective of the shelf flange bracket 7. The bracket bridges between the planter shelf flanges 22 and the shelf flanges below the web bridge 24. The bracket is secured to the shelf flanges 22 with bolts 19. The bracket 7 protects the planter shelf flanges 22 from flaring out and/or caving in. The bracket 7 can be installed at factory or in the field and be placed intermittently. As with other members of the vertical cultivation system, the bracket 7 can be made of metallic or non-metallic material. In some embodiments in lieu of the bracket a bridge similar to the planter vessel bridge can be factory pre-fabricated (not shown).

FIG. 3D shows the same section as 3B also employing the planter flange bracket 7.

FIGS. 4*a*, 4*b*, 4*c*, 4*d*, and 4*e* show the vertical planter assembly 1 planter shelf 20 as support elements. These elements include the post 2 and the shelf bracket 15.

Figure 8D:
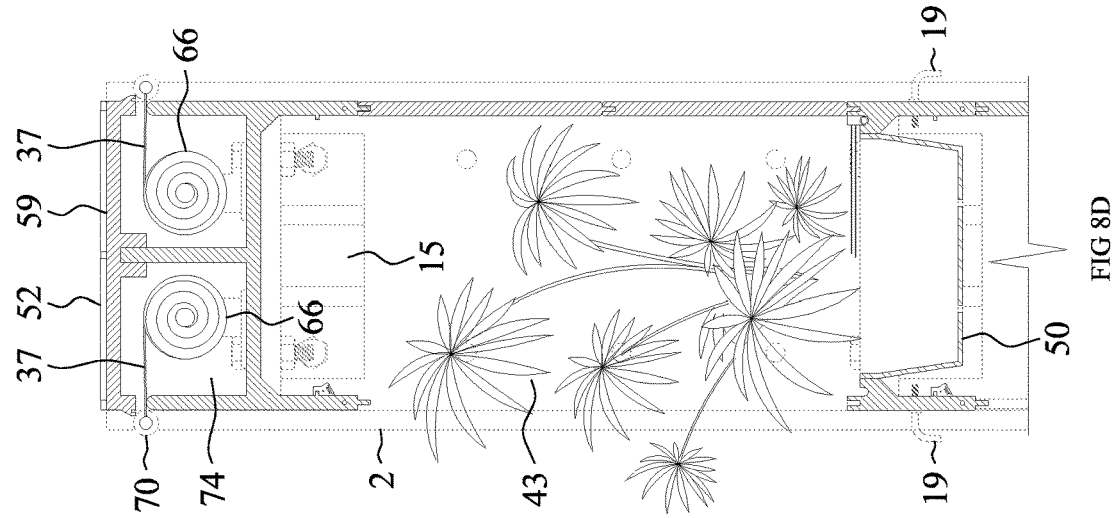
FIG. 8D shows a partial transverse section of an automated outdoor modular vertical plant cultivation system top with a shelf containing roll-down tarps, according to an embodiment.

FIG. 4*a* shows a partial perspective view of the post 2 with the shelf bracket 15 bolted onto its post web 5. In another embodiment through-bolts 16 can connect the flanges of the post 6 to the flanges of the planter shelf 22 adding support strength. FIG. 9*a* shows the post 2 with such bores pre-drilled 17. The post web 5 and its flanges may contain optional tensile reinforcements 18 embedded in its wall. The web and the bracket can be fabricated of metallic or non-metallic non-corrosive material resistant to pollution and adapted to require paint and/or UV coating. Pre-drilled bores 17 at repeated spacing extending the length of the post webs enable mounting the shelf bracket 15 at suitable spacing between planter shelves 20. Also shown are a fluid pipe 12 and power or power and data conduit 13 in proximity to the junction point between the post flanges 6 and the post web 5. Irrigation equipment and power devices mounted to the post's web 5 are accessible from the planter shelf 20 side. In some embodiment the irrigation equipment can be enclosed by a cover (not shown). Other equipment can be placed inside a top shelf enclosure shown in FIG. 8*d* element 74.

The shelf bracket 15 has two bores 17 at its top surface and an additional two bores 17 at its side wall. Bolts 16 secure the bracket 15 to the planter shelf 20 above the post web at its side wall. The post web can accept brackets 15 from both sides employing a single bolt 16 per bore 17. To increase the bracket 15 capacity to support the planter shelf, the bracket employs two bracket ledge stiffeners 75 joining the bracket's top surface with the side wall. FIG. 4*b* shows the bracket 15 front view. FIG. 4*c* shows the bracket 15 back view. FIG. 4*d* shows the bracket 15 side views and FIG. 4*e* shows the bracket 15 bottom view. In a different configuration, the shelf bracket 15 may have side flanges 87. These flanges 87 abut the post web flanges 6 securing the planter shelves 20 and bracket 15 to the post 2 with bolts 19.

Figure 5C:
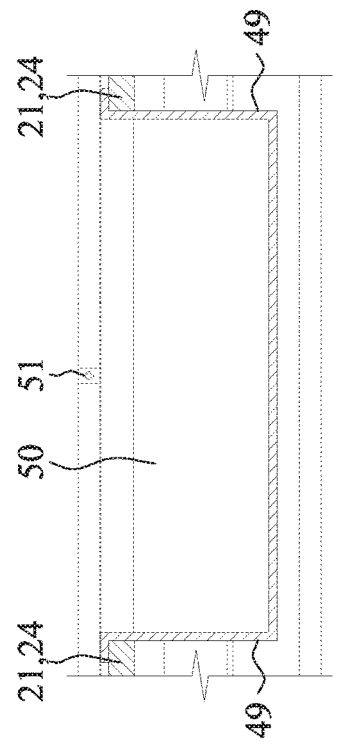
FIG. 5C shows a longitudinal section taken along line 5C-5C of FIG. 5a of a planter vessel opening of a shelf of an automated outdoor modular vertical plant cultivation system, according to an embodiment.
Figure 5A:
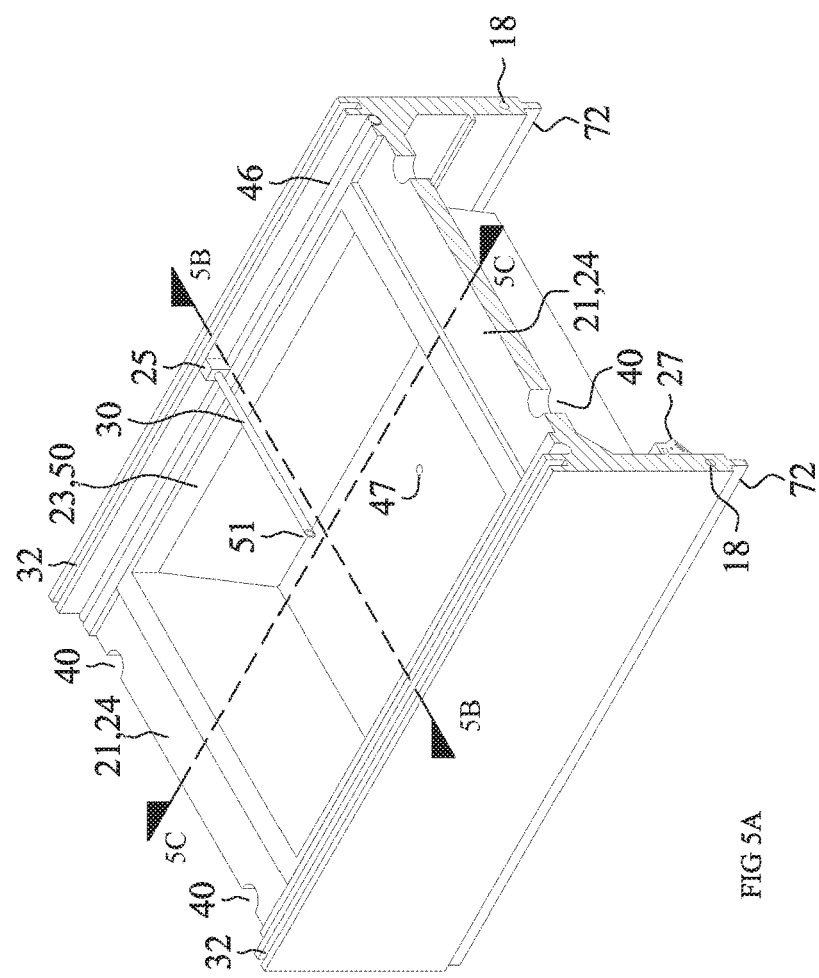
FIG. 5A shows a perspective of a planter vessel opening of a shelf of an automated outdoor modular vertical plant cultivation system, according to an embodiment.

FIG. 5*a* and sections 5*b*-5*b* and 5*c*-5*c* show the plant vessel 50 in perspective inserted inside a section of the planter shelf 20 and in section view perpendicular to one another inside the planter shelf.

FIG. 5*a* perspective view elements include the planter vessel opening 23 enclosed by fire walls of the planter vessel 50, the fluid irrigation system including the planter irrigation pipe 46, the "T" junction 25, the vessel irrigation pipe 30, and the pipe nozzle 51. The plant vessel hangs on the planter shelf web/bridge 21/24 having ends on its longitudinal sides parallel to the planter shelf's 20 longitudinal axis overhung projection.

Also shown are the bridge crossbar bore 40, lighting device 27, optional tensile reinforcement 18, shelf flange partition protrusion 72, and partition insert groove 32.

FIG. 5b is a transverse section across the planter shelf 20 through the plant vessel 50. The plant vessel 50 is tapered in at both sides of the planter shelf flanges 22 concealing the light device 27 from view while permitting it to illuminate the plant material 43 below. Also shown is the plant vessel fluid system including the planter irrigation pipe 46, the "T" junction 25, the vessel's irrigation pipe 30, its fluid nozzle 51 and the fluid evacuation nozzle 51.

FIG. 5c is a longitudinal section through the planter vessel 50 parallel with the planter shelf's longitudinal axis. This section shows the planter vessel's non-sloped walls 49 with two overhung ears resting on the planter shelf web/bridge 21/24.

FIGS. 6a, 6b and 6c show different planter configuration transverse partial sections through the vertical planter assembly 1.

FIG. 6a shows a double back-to-back vertical planter assembly 1 with partition panel 31 obstructing the view beyond the plant vessel 50. This embodiment could be used as a party wall/fence in residential sub-divisions and/or in urban community gardens.

FIG. 6b shows a similar view with only a single shelf planter 20.

FIG. 6c shows an embodiment with a single shelf planter 20 backed against a sound attenuation panel 78. The panels 78 are modular and provide both a visual barrier and reduce/eliminate sound travel through the wall. Where sound mitigation is needed, sound cancellation devices 79 can be added to the vertical planter assembly 1 system.

The above three embodiments also show plant material 34, the plant vessel fluid system 46/30/51 and the lighting system 27.

FIGS. 6d, 6e and 6f show the tongue and grove partition panel 31 system.

FIG. 6d shows a side view of a typical partition panel 31. On top of the panel, a partition panel groove 32 extends the length of the panel. At the bottom, a partition protrusion extends the length of the panel. Dashed lines shown on the panel's longitudinal axis represent partition stiffener bores 68. FIG. 6e is a front view of the panel and FIG. 6f shows a perspective view of the partition panel 31.

FIGS. 7a, 7b and 7c show the fluid, the data, the sensing, the power and the control devices for the vertical plan assembly 1. The assembly figures are depicted employing three diagrams for clarity. In actuality, they share common elements, and may operate by the same processor 56 and controller 57.

FIG. 7a shows the vertical plan assembly 1 fluid circulation network. Planter irrigation pipe 46 riser delivers fluid to the planter shelf 20. The fluid pipe 12 is positioned vertically against the post web 5 with "T" junction 25 connectors in proximity to the mounting shelf bracket 15. From there, the fluid travels through the planter irrigation pipe 46 on through a secondary "T" junction 25 connector to the vessel irrigation pipe 30 and into the plant vessel 50 through the pipe's fluid nozzle 51. The irrigation piping network can be fabricated of polymer material resistant to UV subject to wide variance in temperature.

FIG. 7b shows data, power and power-consuming devices housed or attached to the vertical planter assembly. The devices include an antenna 55, 10/53 backup power storage device/invertor, photovoltaic panels 52, lighting device 27, moisture sensor 36, occupancy sensor 63, temperature sensor 64, security sensor 65, camera 34, speaker 35, microphone 62, and noise cancellation device 80.

FIG. 7c shows the power inlet 8 and fluid inlet 76. The vertical assembly can operate all system devices including or excluding the irrigation system. Typically, the electrical system operates a pump 11. Fluid entering the inlet 76 can be stored in a fluid container/mixing tank 14 or directly pumped through to plant material 34. The pump may also divert fluid into the fluid container/mixing tank 14 and from there fluid may reach the plant material by gravity force or through the pump. The pump and the fluid container/mixing tank 14 can be located inside a shelf, against the post web 5 or in a remote location away from the vertical plant assembly 1.

The power and data key elements of the vertical plant assembly 1 include a processor 56, a controller 57, a communication module 61, power module 58 and power supply 69. In some embodiments, the assembly 1 may also include a backup power storage device 10 and/or an inverter 53. The entire power and communication network operate by low voltage power.

Figure 8A:
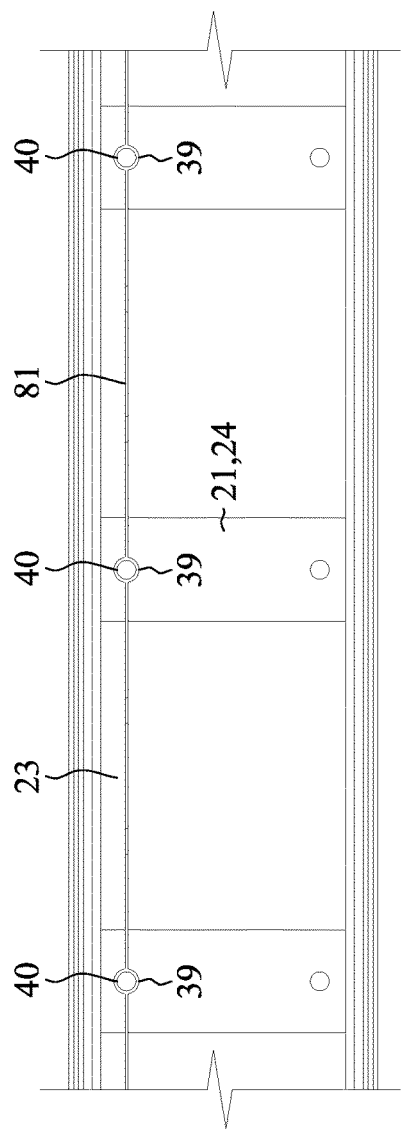
FIG. 8A shows a partial view of crossbars penetrating through a planter shelf bridge with a fence, according to an embodiment.
Figure 8B:
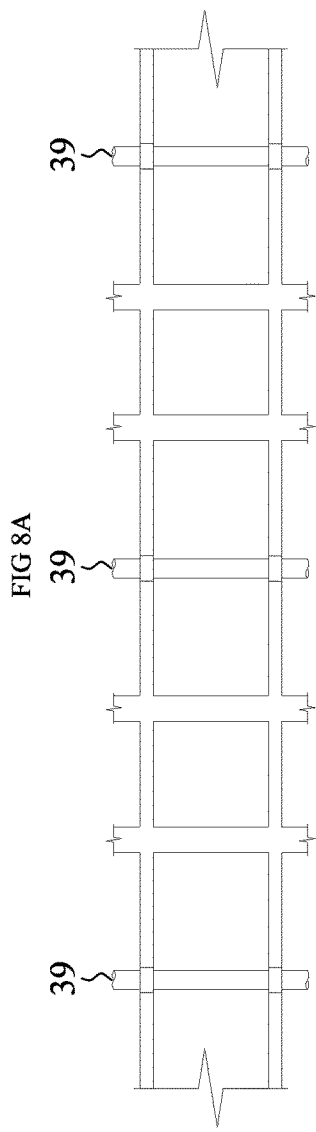
FIG. 8B shows a partial elevation of a fence of an automated outdoor modular vertical plant cultivation system, according to an embodiment.
Figure 8C:
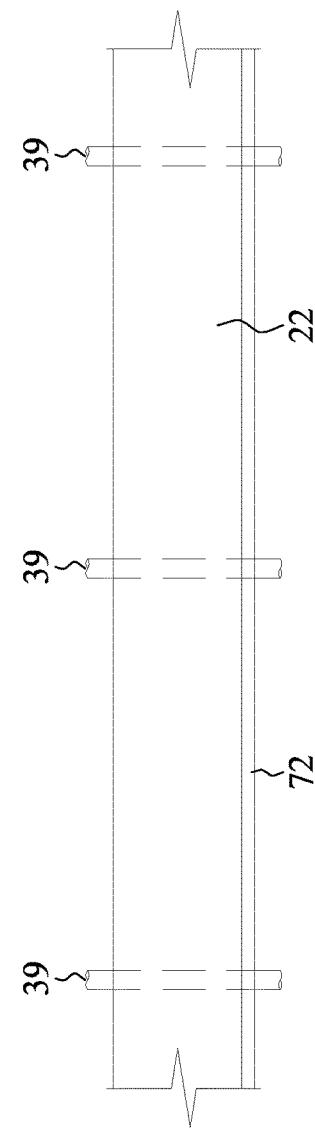
FIG. 8C shows a side elevation of crossbars penetrating through a planter shelf bridge with a fence, according to an embodiment.

FIGS. 8a, 8b and 8c show the planter shelf 20 crossbars 39. The crossbars provide a mounting structure for a security fence 81. The crossbars' 39 bores 40, in conjunction with the bars 39 or without, can provide a mounting location for securing the planter vessel 50 against theft.

FIG. 8a shows a plan view of crossbars 39 penetrating through the planter shelf bridge 24 with a fence 81 extending from bar 39 to bar 39.

FIG. 8b shows in elevation view an exemplary embodiment of the fence 81 with rings. The fence 81 rings are inserted into the crossbars 39 during the vertical planter assembly 1 erection to form a continuous fence.

FIG. 8c shows the planter shelf 20 elevation with the crossbars 39 penetrating through.

FIG. 8d shows the vertical planter assembly 1 top with a shelf containing tarps 66. The tarps protect plant material 43 against frost. The tarps are coiled around a bar with retractable capability pulling against the tarp pull bar 70. The tarp housing 74 is divided into two chambers, whereas the dividing wall provides support for the housing's top cover 59. Photovoltaic panels 52 can be mounted on the top cover 59 and an inverter 53 and/or back-up power/storage device 10 can be placed inside the tarp's housing 74. Further, the housing can also be used to retain power and irrigation devices.

Figure 9C:
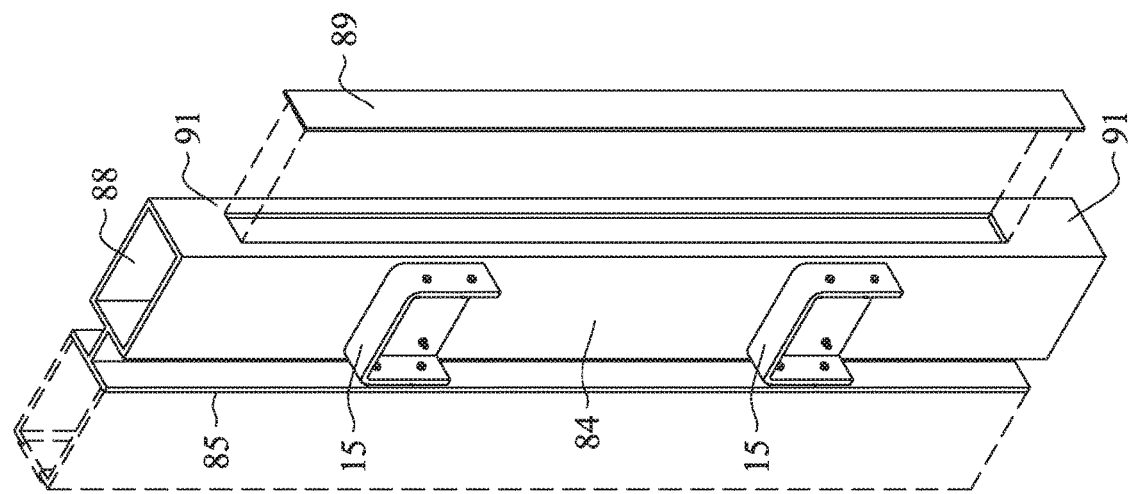
FIG. 9C shows a perspective of the chase post with shelves and wall retaining flanges according to an embodiment.
Figure 9B:
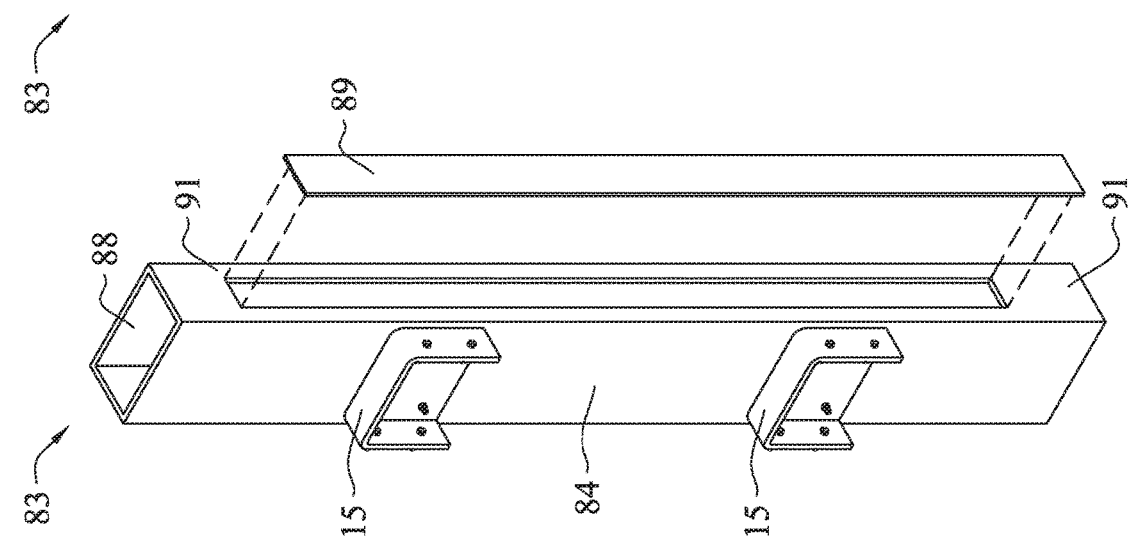
FIG. 9B shows a perspective of the chase post with shelf brackets according to an embodiment.
Figure 9A:
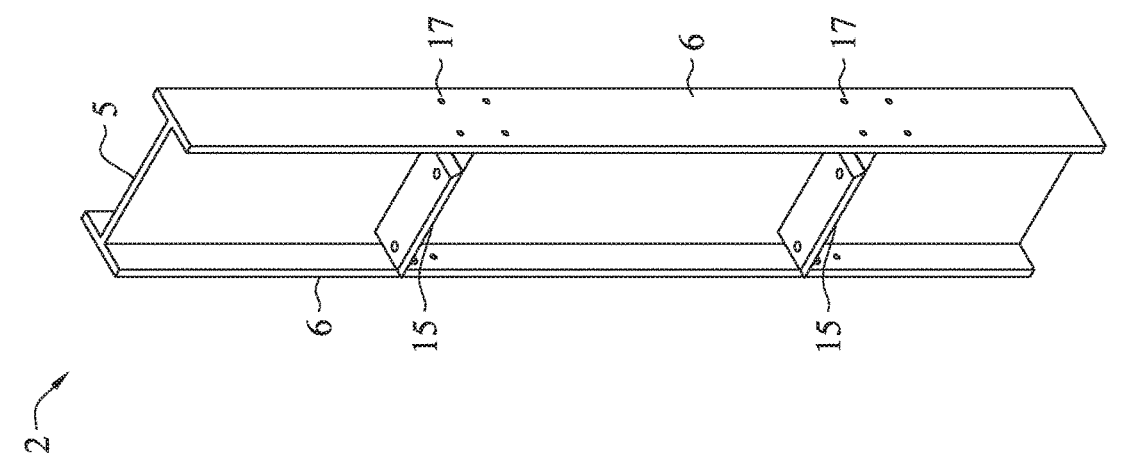
FIG. 9A shows a perspective of the post with shelf brackets according to an embodiment.

FIGS. 9a, 9b and 9c show perspective views of the plant cultivation system shelf support post.

FIG. 9a shows a perspective view of the post shown in FIG. 4a, in partial perspective. In this configuration, the post 2 shows a web 5 and flanges 6 on both sides. Post brackets 15 are mounted to the post 2 web 5, and bores 17 drilled into the post flanges 6 can connect the post 2 to the planter shelf flanges 22 using bolts 19.

FIG. 9b shows a perspective view of the chase post 83 supporting the planter shelves 20. In this configuration, as is in FIG. 9a, the planter shelves 20 rest on and are secured to the shelves' brackets 15. The brackets are secured to the chase post wall 84. The brackets' flanges 87 in this configuration attach directly to the shelf flanges 22, in the absence of post flanges 6 to attach to. The chase post 83 retains power 99, communication 98, sensing 97, and processing devices 96, as well as electromechanical fluid circulation equipment 95. Power 99, plant fluid 100, or both typically enter the chase post 83 from below, connecting to its devices inside, and from there power 99 and fluid 100 is/are networked to the shelf's plant vessel/s 50 and electrical devices. The chase post enclosure 88 is secured by an access panel 89 mounted onto the chase post outward wall 91. The panel may employ a tamper-proof lock/s 92 and support the placement of power devices mounted onto its interior and exterior surfaces.

FIG. 9c shows a perspective view of the chase post 83 supporting the cultivation system shelves and a panelized wall 67 system on one side of the cultivation system's longitudinal sides. In this configuration, the planter shelves 20 rest on and are secured to the shelf bracket 15 whereas the bracket is secured to the wall of the post 84. Interlocking panels 67 placed on one another and wedged between the chase post flanges 85 form a wall. At the top of the post 83, an anti-uplift device attached to the post secures the wall from uplift movement. The chase post 83 retains power 99, communication 98, sensing 97, and processing devices 96, as well as electromechanical fluid circulation equipment 95. Power 99, plant fluid 100, or both typically enter the chase post 83 from below, connecting to its devices inside, and from there power 99 and fluid 100 is/are distributed across the network of shelves. The chase post enclosure 88 is secured by an access panels 89 mounted onto the chase post outward wall 91. The panel may employ a tamper-proof lock/s 92 and support the placement of power devices mounted onto its interior and exterior surfaces. Also shown in this embodiment (in dash line) is an alternate double-sided planter shelf 20 with a panelized wall 67 between.

FIGS. 10a, 10b, 10c, 10d, and 10e, show the planter shelf bracket elevation compatible with post configuration shown in FIGS. 9b and 9c.

FIG. 10a shows the front elevation of the shelf bracket 15 facing the planter shelf 20. In this embodiment the bracket 15 attaches to the chase post wall 84 by four through bolts 16 and to the planter shelf 20 with two bolts 19 at each side of the shelf bracket 15 connecting to the planter shelf flanges 22.

FIG. 10b shows the back elevation of the shelf brackets 15 facing the chase post wall 84. In this embodiment the bracket 15 attaches to the chase post wall 84 by four thorough bolts 16 and to the planter shelf 20 with two bolts 19 at each side of the bracket 15 connecting to the planter shelf flanges 22.

FIG. 10c shows two side elevations of the shelf bracket 15 with two bores 17 at its flange 87 and two bores 17 at its vertical wall abutting the chase post wall 84. On top, the bracket's shelf seat 86 supports the planter shelf 20 during installation. This support enables the installer to drill bores or drill bores 17 and thread bores 17 precisely where needed without having to support the planter shelf 20.

FIG. 10d shows an elevation of the shelf bracket's 15 top with the bracket's planter shelf seat 86, two bores 17 at the wall facing the chase post wall 84 and a single bore 17 at each flange 87 side.

FIG. 10e shows an elevation of the shelf brackets' 15 bottom with the bottom of the planter seat 93, above, two bores 17 at the wall facing the chase post wall 84 and a single bore 17 at each flange side 87.

FIG. 11 shows an enlarged horizontal section through the chase post 83 with planter shelves 20 abutting its wall 84 and attenuation wall panels 67 wedged inside its flanges 85. The chase post enclosure 88, walls shown supporting the load of the planter shelves with both connected by through bolts 16 to the shelves bracket 15. The access panel 89 is shown mounted against the chase's outer face 91 enabling easy access to the chase post's enclosure 88. Also shown are partial section designations showing shelf 20 connectivity to the chase post 83 in FIGS. 12a and 12b.

Figure 12B:
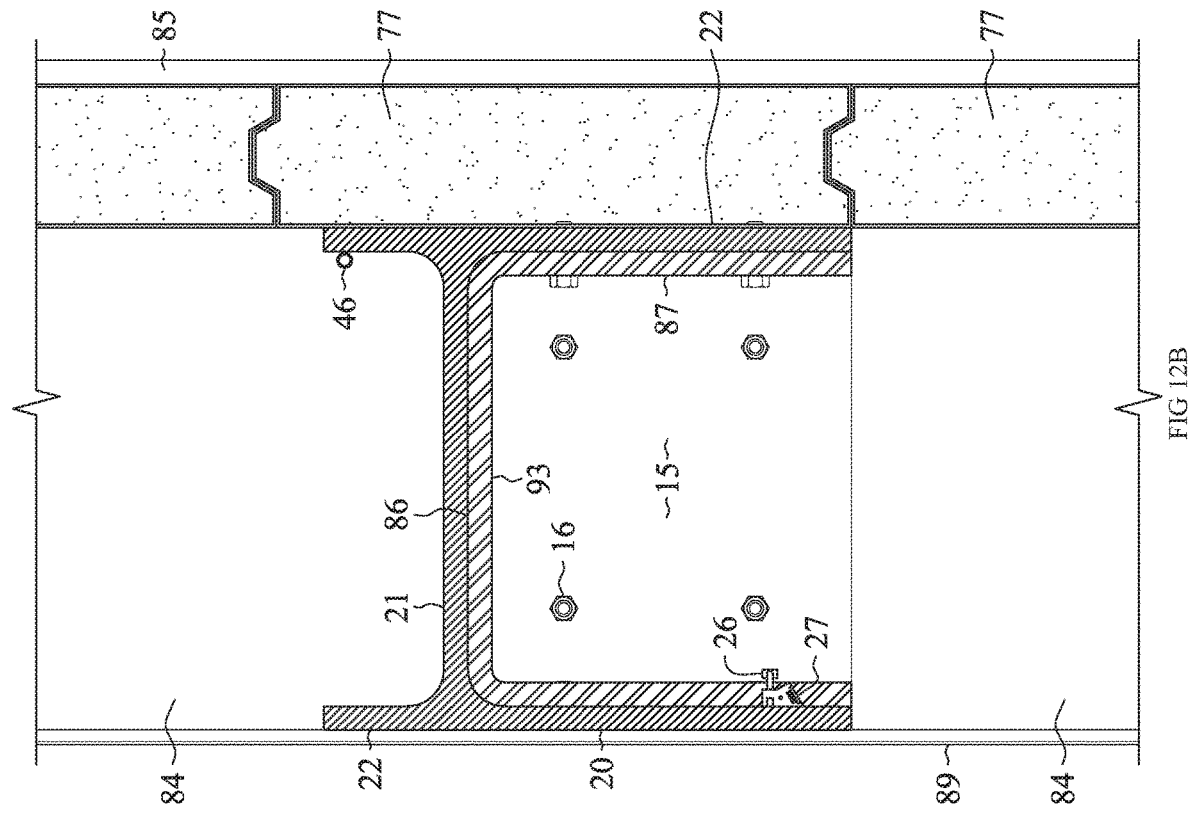
FIG. 12B shows an enlarged partial planter and sound attenuation wall transverse vertical section, according to an embodiment.
Figure 12A:
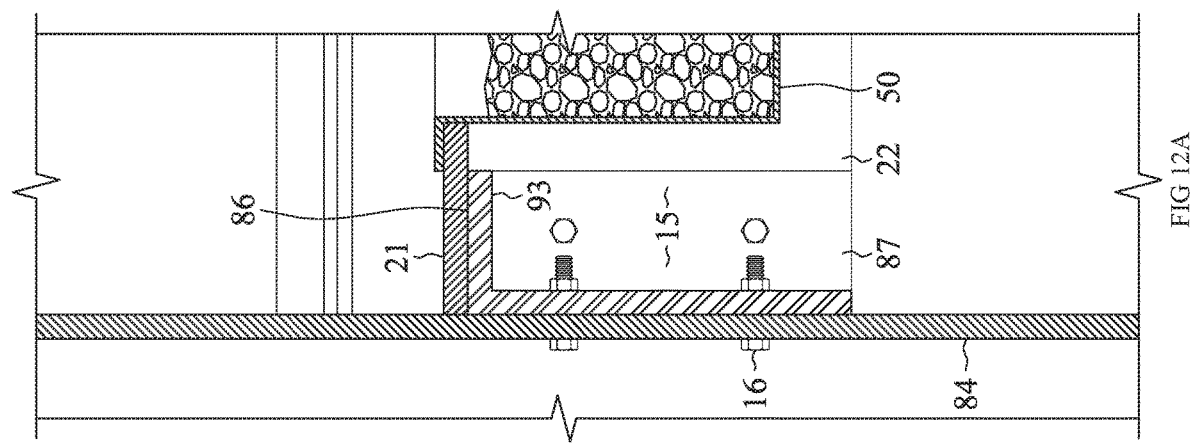
FIG. 12A shows an enlarged partial planter shelf interior vertical section between the chase post the planter shelf and the post bracket, according to an embodiment.

FIGS. 12a and 12b show enlarged partial sections showing the planter shelf's 20 connectivity to the chase post wall 84.

FIG. 12a shows a partial enlarged vertical section of the planter shelf 20 supported by the planter bracket 15 connected to the chase post wall 84. This section also shows the planter shelf 20 inner side flange 85 with the paneled wall 67 behind. The section shows a pair of bolts 19 spaced apart at the inner planter wall flange 22, a pair connecting the shelf bracket 15 to the chase post wall 84.

FIG. 12b shows a partial enlarged transverse vertical section through the planter shelf 20 and the panelize wall 67 looking toward the chase post shelf supporting wall 84. Elements shown include an outline (in dashed line) of the plant vessel 50, a continuous light source mounted to the inner face of the plant shelf 20 outer flange 22 at its bottom, a continuous shelf irrigation pipe 46 at the top, the shelf bracket 15 with bolts 19 attaching the bracket 15 to the chase post wall 84 and to the flanges of the plant shelf 22 and wedged between the chase post flanges 85, sound attenuating panels 77. Inside the bottom side of the shelf flanges 22, a pair of high tensile strength bars 18 are shown embedded. When long plant shelf span is required, and/or the plant vessels weight is heavy, the tensile bars/s 18 help reduce the cross-sectional depth of the shelf's flanges 22.

FIGS. 13a, 13b, and 13c show transverse sections of the planter cultivation system according to the three post embodiments shown in FIGS. 9a, 9b, and 9c.

FIG. 13a, shows a transverse section of the planter shelf 20 employing a retaining post 2 with shelf brackets 15 as shown in FIG. 4. In this embodiment, the planter web bridge 24 rests on the bracket's planter shelf seat 86 and is secured by two through bolts 19. In an alternate embodiment, securing bolts 19 through the flanges of the planter shelf 22 and the post wall. (not shown)

FIG. 13b shows a transverse section of the planter shelf 20 employing a retaining chase post 83 with shelf bracket 15 shown in FIG. 10. In this embodiment the planter shelf web bridge 24 rests on the bracket planter shelf seat 86 and is secured to the chase post by two bolts 19 connecting the bracket's flanges 87 to the planter shelf flanges 22 at both sides. In this embodiment the top shelf shows an enclosure containing a roll-down tarp 66.

FIG. 13c shows a transverse section of the planter shelf 20 employing a retaining chase port 83 with shelf brackets 15 shown in FIG. 10 and wall retaining flanges 85. In this embodiment, the planter shelf 20 arrangement is the same as shown in 13b with exception of the chase post 83 cross section. The chase post 83 includes a wall retaining flange 85. The flange 85 may be one sided or two sided. This figure shows a one-sided configuration with a second side in dashed line. The wall shown in this embodiment is panelized 61 where the keyed panels 78 rest on one another and are wedged between the chase post flanges 85. The top shelf shows an enclosure 74 containing a power storage unit 55 and photovoltaic panel/s 52 on top.

FIGS. 14a, 14b, 14c, and 14d show partial front and top elevations of the chase post 83 with shelves mounted on both sides and a panelized wall behind the shelves 61.

FIG. 14a shows a partial front elevation of the chase wall 91 absent its access panel 89 with the planter shelves 20 supported by the planter shelves bracket 15 mounted to the chase post wall 84. Also, shown behind the planter shelves 20 are wall panels 78.

FIG. 14b shows the top view of the vertical cultivation system employing a chase post 83 absent the post's top cover. In this figure, the chase post 83 enclosure and the panelized wall 67 wedged in between the post's flanges 85. Fluid circulation pipes 12 rising inside the chase enclosure 88 are shown flaring out through the walls of the chase to run along the inner side of the planter shelf flanges 22 with drip spouts 30 positioned over the planter vessels 50 opening.

FIG. 14c shows a partial front elevation of the chase post outward 91 wall with its access panel cover 89 supporting plan shelves 20 populated with plant vessels 50 and panelized wall 61 behind. Also shown in this figure is one tamper proof lock 92 for the chase access cover 89 and surveillance camera 34 at the top of the access panel 89.

FIG. 14d shows the top view of the vertical cultivation system employing a chase post 83. In this figure, photovoltaic panels 52 are shown mounted to a top shelf. The top shelf may have an enclosure 74 that retains a power storage device 58, roll-down tarp 66, and other devices requiring an enclosed space. Next to the photovoltaic panels 52, the top face of the panelized walls 67 is shown with up-lift locks 94 securing the panel to the post's web and/or flanges 85.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A modular vertical cultivation wall system comprising:
at least one elongated planter shelf coupled at both ends to two vertically oriented structural support members,
wherein the elongated planter shelf comprises at least one flange coupled to a web, and
wherein the web has at least one opening retaining and supporting a planter vessel therewithin, such that the elongated planter shelf is a self-supporting structure that extends between, and couples to, the vertically oriented structural support members, and a fluid circulatory system and power conductors longitudinally disposed along at least a portion of a length of the elongated planter shelf,
wherein the fluid circulatory system is configured to provide fluid to the planter vessel retained by the web of the elongated planter shelf and the power conductors provide power to at least one electrical device coupled to the elongated planter shelf, and
wherein the vertically oriented structural support members are configured to receive at least one wall panel extending therebetween.

2. The system of claim 1, wherein the fluid circulatory system includes a fluid irrigation pipe having a spout oriented to deliver fluid directly to the planter vessel, and wherein at least one of the power conductors is coupled to a light source extending along at least a portion of the length of the planter shelf.

3. The system of claim 1, further comprising a high tensile strength reinforcement member longitudinally coupled to at least one planter shelf flange.

4. The system of claim 1, further comprising brackets mounted to the planter shelf, wherein a position of the brackets is adjustable along a height of the vertically oriented structural support members.

5. The system of claim 4, wherein at least one of the elongated planter shelf, the plant vessel, the brackets, the vertically oriented structural support members, and the wall panel is made of non-metallic material.

6. The system of claim 1, further comprising at least one of a photovoltaic device and an Internet of Things (IoT) device, wherein the photovoltaic device and the IoT device are coupled to at least one of the planter shelf and the vertically oriented structural support member.

7. The system of claim 1, further comprising a horizontal member extending between the vertically oriented structural support members and over the planter shelf, wherein the horizontal member includes a horizontal member enclosure configured to at least one of retain a shading device, retain a power storage device, and retain fluid.

8. The system of claim 1, wherein at least one of the vertically oriented structural support members includes a structural member enclosure therewithin, wherein the structural member enclosure is configured to receive at least one of a component of the fluid circulatory system and a component of the power distribution device.

9. The system of claim 1, wherein the wall panel is at least one of a screen, a bar, and a fence having sound attenuation properties.

* * * * *